United States Patent
Venkataramani et al.

(10) Patent No.: US 12,475,553 B2
(45) Date of Patent: Nov. 18, 2025

(54) MACHINE LEARNING IMAGE ANALYSIS BASED ON EXPLICIT EQUIPMENT PARAMETERS

(71) Applicant: GE Precision Healthcare LLC, Wauwatosa, WI (US)

(72) Inventors: Rahul Venkataramani, Bengaluru (IN); Vikram Reddy Melapudi, Bangalore (IN); Prasad Sudhakara Murthy, Bengaluru (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 512 days.

(21) Appl. No.: 17/933,322

(22) Filed: Sep. 19, 2022

(65) Prior Publication Data

US 2024/0104718 A1    Mar. 28, 2024

(51) Int. Cl.
*G06T 7/00* (2017.01)
*G06N 3/04* (2023.01)
(Continued)

(52) U.S. Cl.
CPC .............. *G06T 7/0012* (2013.01); *G06N 3/04* (2013.01); *G06N 3/08* (2013.01); *G16H 30/40* (2018.01);
(Continued)

(58) Field of Classification Search
CPC .............. G06T 7/0012; G06T 2200/24; G06T 2207/20081; G06T 2207/20084; G06T 2207/30004; G06T 7/00; G06N 3/04; G06N 3/08; G06N 3/045; G06N 3/084; G16H 30/40; G16H 30/20; G16H 40/67
(Continued)

(56) References Cited

U.S. PATENT DOCUMENTS

| 2021/0390696 A1* | 12/2021 | Iwase ..................... G06T 5/60 |
| 2022/0327691 A1* | 10/2022 | Pelissier ................ G16H 40/67 |
| 2023/0062811 A1* | 3/2023 | Kunz ..................... G16H 30/40 |

FOREIGN PATENT DOCUMENTS

| CN | 113747838 | * 12/2021 | ........... A61B 6/5211 |
| CN | 114596951 | *  6/2022 | ............... A61B 6/40 |

(Continued)

OTHER PUBLICATIONS

Zhang et al., Deep unfolding network for image super-resolution, Proceedings of the IEEE/CVF conference on computer vision and pattern recognition, p. 3217-3226, 2020, 10 pgs.

(Continued)

*Primary Examiner* — Jerome Grant, II
(74) *Attorney, Agent, or Firm* — Amin, Turocy & Watson, LLP

(57) ABSTRACT

Systems/techniques that facilitate machine learning image analysis based on explicit equipment parameters are provided. In various embodiments, a system can access a medical image generated by a medical imaging device. In various instances, the system can perform, via execution of a machine learning model, an inferencing task on the medical image. In various cases, the machine learning model can receive as input the medical image and a set of equipment parameters. In various aspects, the set of equipment parameters can indicate how the medical imaging device was configured to generate the medical image.

20 Claims, 14 Drawing Sheets

(51) Int. Cl.
*G06N 3/08* (2023.01)
*G16H 30/40* (2018.01)

(52) U.S. Cl.
CPC ............... *G06T 2200/24* (2013.01); *G06T 2207/20081* (2013.01); *G06T 2207/20084* (2013.01); *G06T 2207/30004* (2013.01)

(58) Field of Classification Search
USPC ......................................................... 382/128
See application file for complete search history.

(56) References Cited

FOREIGN PATENT DOCUMENTS

| KR | 20220050173 | * | 4/2022 | ............. A61B 6/037 |
| WO | WO2023129190 | * | 7/2023 | ............... G06N 3/08 |

OTHER PUBLICATIONS

Dosovitskiy et al., You Only Train Once: Loss-Conditional Training of Deep Networks, Published as a conference paper at ICLR, 2020, 17 pgs.

* cited by examiner

FIG. 11

MACHINE LEARNING IMAGE ANALYSIS BASED ON EXPLICIT EQUIPMENT PARAMETERS

TECHNICAL FIELD

The subject disclosure relates generally to machine learning, and more specifically to machine learning image analysis based on explicit equipment parameters.

BACKGROUND

A machine learning model can be trained to perform an inferencing task on a medical image. How accurately the machine learning model performs the inferencing task can depend upon the medical imaging device that generated or captured the medical image.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate machine learning image analysis based on explicit equipment parameters are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a medical image generated by a medical imaging device. In various aspects, the computer-executable components can further comprise an execution component that can perform, via execution of a machine learning model, an inferencing task on the medical image. In various instances, the machine learning model can receive as input the medical image and a set of equipment parameters. In various cases, the set of equipment parameters can indicate how the medical imaging device was configured to generate the medical image.

According to one or more embodiments, the above-described system can be implemented as a computer-implemented method or a computer program product.

DESCRIPTION OF THE DRAWINGS

FIGS. 10-11 illustrate example, non-limiting experimental results in accordance with one or more embodiments described herein.

DETAILED DESCRIPTION

Figure 1:
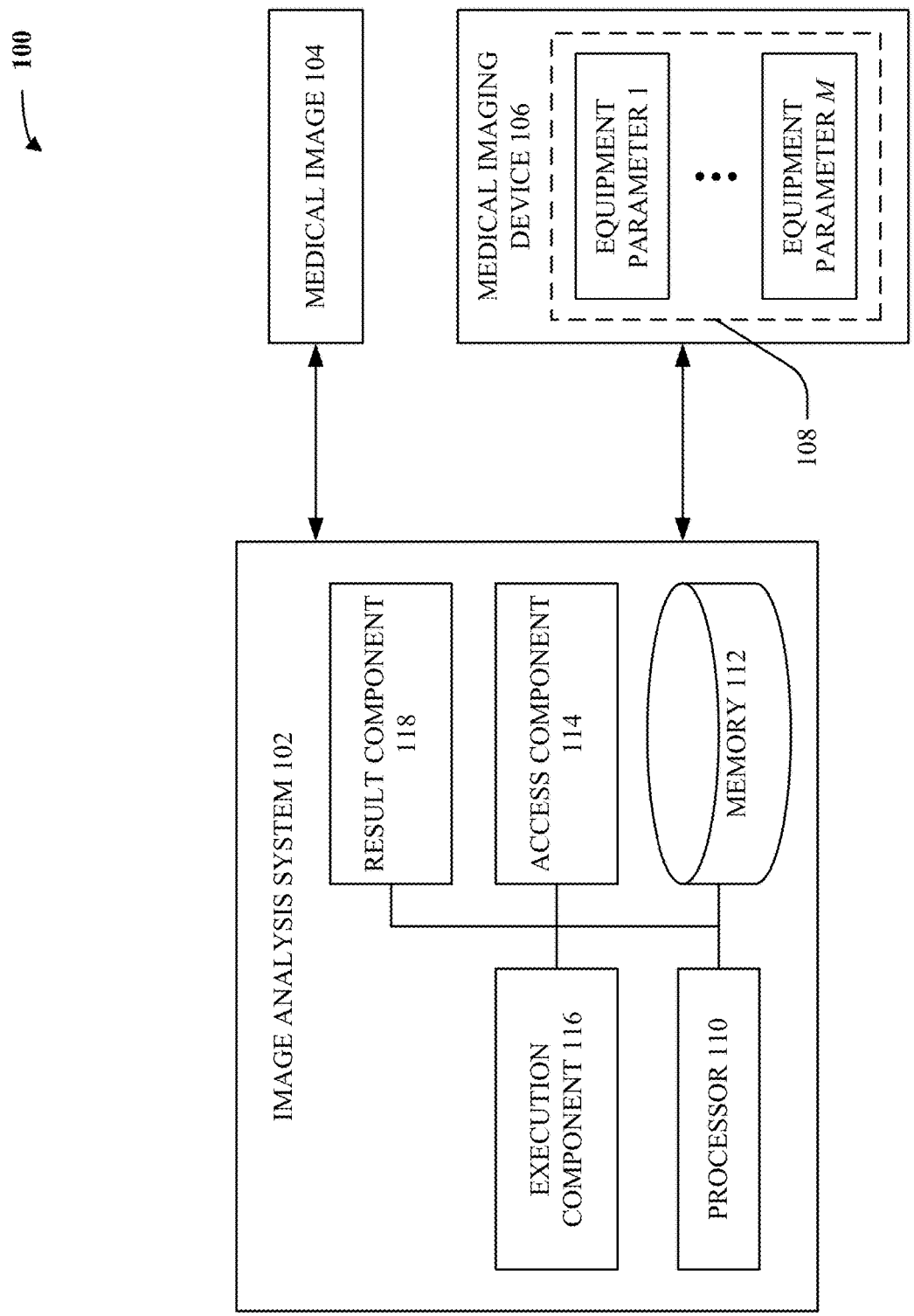
FIG. 1 illustrates a block diagram of an example, non-limiting system that facilitates machine learning image analysis based on explicit equipment parameters in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A machine learning model (e.g., a deep learning neural network) can be trained (e.g., via supervised training, unsupervised training, reinforcement learning) to perform an inferencing task (e.g., image quality enhancement, image denoising, image kernel transformation, image segmentation, image classification) on medical images (e.g., scanned/reconstructed images generated by a computed tomography (CT) scanner, scanned/reconstructed images generated by a magnetic resonance imaging (MRI) scanner, scanned/reconstructed images generated by a positron emission tomography (PET) scanner, scanned/reconstructed images generated by an X-ray scanner, scanned/reconstructed images generated by an ultrasound scanner).

How accurately the machine learning model performs the inferencing task on a given medical image can depend upon visual characteristics (e.g., contrast, brightness, resolution) exhibited by that given medical image and upon the visual characteristics exhibited by the medical images on which the machine learning model was trained. In particular, the machine learning model can be expected to accurately analyze the given medical image if the given medical image's visual characteristics are similar to those of the medical images on which the machine learning model was trained. On the other hand, the machine learning model can be expected to inaccurately analyze the given medical image if the given medical image's visual characteristics are dissimilar from those of the medical images on which the machine learning model was trained. In various aspects, such visual characteristics can commensurately depend upon various user-controllable or user-configurable settings or properties (e.g., point-spread function, acquisition frequency, focal depth) of the medical imaging devices that generated or captured such medical images. In various instances, such user-controllable or user-configurable settings or properties can be referred to as equipment parameters of the medical imaging devices.

In various cases, when a medical imaging device generates or captures a medical image, the medical imaging device can be configured (e.g., by a user or operator) according to any suitable set of equipment parameters. For example, a first equipment parameter in such set of equipment parameters can represent the point-spread function that the medical imaging device uses to generate or capture the medical image. As another example, a second equipment parameter in such set of equipment parameters can represent the acquisition frequency that the medical imaging device uses to generate or capture the medical image. As still another example, a third equipment parameter in the set of equipment parameters can represent the focal depth that the medical imaging device uses to generate or capture the medical image. In various aspects, the medical image can thus be considered as corresponding to (e.g., as having been generated or captured according to) such set of equipment parameters.

In some existing techniques, the machine learning model can be trained on training medical images, where all of such training medical images can have been generated or captured according to a same, uniform, or common set of equipment parameters (e.g., all of such training medical images can have been generated or captured according to a same point-spread function as each other, according to a same acquisition frequency as each other, or according to a same focal depth as each other). In such case, the machine learning model can be expected to accurately perform (post-training) the inferencing task on any medical image that has been generated or captured according to that same set of equipment parameters (e.g., according to that same point-spread function, according to that same acquisition frequency, or according to that same focal depth). However, the machine learning model cannot be expected to accurately perform (post-training) the inferencing task on any medical image that has been generated or captured according to a different set of equipment parameters (e.g., according to a different point-spread function, according to a different acquisition frequency, or according to a different focal depth). Therefore, when the machine learning model is trained on training medical images that all correspond to the same set of equipment parameters as each other, a distinct and differently-trained machine learning model can be warranted whenever it is desired to perform the inferencing task on a medical image that has been generated or captured according to a different set of equipment parameters. This can result in a very large, unwieldy number of machine learning models (e.g., one unique machine learning model per unique set of equipment parameters) that are all trained to perform the inferencing task, which can consume excessive amounts of computing resources. In particular, each of such large, unwieldy number of machine learning models can undergo separate training, which can collectively consume an excessive amount of time. Moreover, each of such large, unwieldy number of machine learning models can be electronically stored post-training, which can collectively consume an excessive amount of computer memory. Furthermore, since equipment parameters of medical imaging devices can often be continuously variable, a finite number of distinct and independently-trained machine learning models can be unable to collectively be trained on all possible sets of equipment parameter values. For at least these reasons, existing techniques that train the machine learning model on training medical images that have all been generated or captured according to a same, uniform, or common set of equipment parameters can be disadvantageous.

In other existing techniques, the machine learning model can be trained on training medical images, where various of such training medical images can have been generated or captured according to different sets of equipment parameters than each other (e.g., according to different point-spread functions than each other, according to different acquisition frequencies than each other, or according to different focal depths than each other). Unfortunately, in such case, the machine learning model's post-training performance can be averaged across all of such different sets of equipment parameters. In other words, the machine learning model can be expected to perform the inferencing task better than terribly, but worse than well, on medical images generated or captured according to any of such different sets of equipment parameters. In still other words, the machine learning model trained in such fashion can be considered as being a "jack of all trades, master of none" with respect to such different sets of equipment parameters. For at least these reasons, existing techniques that train the machine learning model on training medical images that have been generated or captured according to different sets of equipment parameters can be disadvantageous.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate machine learning image analysis based on explicit equipment parameters. In various aspects, the inventors of various embodiments described herein realized why the above-mentioned existing techniques can be disadvantageous and devised various techniques for ameliorating such disadvantages. In particular, the present inventors realized that the above-mentioned existing techniques for training a machine learning model to perform an inferencing task on medical images merely implicitly take equipment parameters into account. In other words, the present inventors realized that such existing techniques account for equipment parameters only by changing the medical images on which the machine learning model is trained (e.g., by curating the training dataset to include various medical images generated or captured according to various different sets of equipment parameters; or by instead curating the training dataset to include medical images generated or captured according to a single, uniform, common set of equipment parameters). In various instances, the present inventors realized that various disadvantages (e.g., excessive consumption of computing resources, reduced model performance across all sets of equipment parameters) of such existing techniques can be ameliorated by configuring or otherwise training a machine learning model to explicitly receive equipment parameters as input. In other words, the machine learning model can be configured to receive as input not just a medical image itself, but also a set of equipment parameters collectively describing an operational configuration of a medical imaging device that generated or captured the medical image. By training the machine learning model to explicitly receive equipment parameters as input, the machine learning model can learn how variations in equipment parameters can correspondingly influence inferencing task outputs. Accordingly, such machine learning model can be applied across different sets of equipment parameters without sacrificing inferencing accuracy, unlike the above-mentioned existing techniques.

Various embodiments described herein can be considered as a computerized tool (e.g., any suitable combination of computer-executable hardware or computer-executable software) that can facilitate machine learning image analysis based on explicit equipment parameters. In various aspects, such computerized tool can comprise an access component, an execution component, or a result component.

In various embodiments, there can be a medical image. In various aspects, the medical image can depict one or more anatomical structures (e.g., tissues, organs, body parts, or portions thereof) of a medical patient (e.g., human, animal, or otherwise). In various instances, the medical image can exhibit any suitable format or dimensionality. For example, in some cases, the medical image can be a two-dimensional array of pixels. In other cases, the medical image can be a three-dimensional array of voxels.

In various aspects, the medical image can be generated or otherwise captured by a medical imaging device. In various instances, the medical imaging device can be any suitable imaging equipment or imaging modality, such as a CT scanner, an MRI scanner, an X-ray scanner, a PET scanner, or an ultrasound scanner. In various cases, the medical imaging device can correspond to or otherwise be associated with a set of equipment parameters. In various aspects, the set of equipment parameters can include any suitable number of equipment parameters. In various instances, an equipment parameter can be any suitable piece of electronic data (e.g., can be one or more scalars, one or more vectors, one or more matrices, one or more tensors, one or more character strings, or any suitable combination thereof) that indicates, represents, or otherwise conveys any suitable user-controllable or user-configurable setting or property that the medical imaging device implemented in order to generate or capture the medical image. As some non-limiting examples, an equipment parameter can be a point-spread function which the medical imaging device implemented to generate or capture the medical image (e.g., the medical imaging device can have a user-configurable setting that allows a user to controllably change the point-spread function implemented by the medical imaging device), an acquisition frequency which the medical imaging device implemented to generate or capture the medical image (e.g., the medical imaging device can have a user-configurable setting that allows a user to controllably change the acquisition frequency implemented by the medical imaging device), a focal depth which the medical imaging device implemented to generate or capture the medical image (e.g., the medical imaging device can have a user-configurable setting that allows a user to controllably change the focal depth implemented by the medical imaging device), a focal spot size which the medical imaging device implemented to generate or capture the medical image (e.g., the medical imaging device can have a user-configurable setting that allows a user to controllably change the focal spot size implemented by the medical imaging device), a time-gain compensation which the medical imaging device implemented to generate or capture the medical image (e.g., the medical imaging device can have a user-configurable setting that allows a user to controllably change the time-gain compensation implemented by the medical imaging device), a line density which the medical imaging device implemented to generate or capture the medical image (e.g., the medical imaging device can have a user-configurable setting that allows a user to controllably change the line density implemented by the medical imaging device), a radiation dose strength which the medical imaging device implemented to generate or capture the medical image (e.g., the medical imaging device can have a user-configurable setting that allows a user to controllably change the radiation dose strength implemented by the medical imaging device), a step size which the medical imaging device implemented to generate or capture the medical image (e.g., the medical imaging device can have a user-configurable setting that allows a user to controllably change the step size implemented by the medical imaging device), or an image reconstruction technique which the medical imaging device implemented to generate or capture the medical image (e.g., the medical imaging device can have a user-configurable setting that allows a user to controllably change the reconstruction technique implemented by the medical imaging device).

In any case, the set of equipment parameters can be considered as collectively representing or indicating a user-controlled operational configuration that the medical imaging device utilized to create the medical image.

In various embodiments, the access component of the computerized tool can electronically receive or otherwise electronically access the medical image or the set of equipment parameters. In some aspects, the access component can electronically retrieve the medical image or the set of equipment parameters from any suitable centralized or decentralized data structures (e.g., graph data structures, relational data structures, hybrid data structures), whether remote from or local to the access component. In other aspects, the access component can electronically retrieve the medical image or the set of equipment parameters from the medical imaging device. In any case, the access component can electronically obtain or access the medical image or the set of equipment parameters, such that other components of the computerized tool can electronically interact with (e.g., read, write, edit, copy, manipulate) the medical image or the set of equipment parameters.

In various aspects, the execution component of the computerized tool can electronically store, maintain, control, or otherwise access a machine learning model. In various instances, the machine learning model can exhibit any suitable artificial intelligence architecture. For example, the machine learning model can exhibit a deep learning neural network architecture. In such case, the machine learning model can include any suitable numbers of any suitable types of layers (e.g., input layer, one or more hidden layers, output layer, any of which can be convolutional layers, dense layers, non-linearity layers, pooling layers, batch normalization layers, or padding layers), can include any suitable numbers of neurons in various layers (e.g., different layers can have the same or different numbers of neurons as each other), can include any suitable activation functions (e.g., softmax, sigmoid, hyperbolic tangent, rectified linear unit) in various neurons (e.g., different neurons can have the same or different activation functions as each other), or can include any suitable interneuron connections or interlayer connections (e.g., forward connections, skip connections, recurrent connections). In other cases, the machine learning model can exhibit any other suitable artificial intelligence architecture (e.g., support vector machine, naïve Bayes, linear regression, logistic regression, decision tree, random forest).

In various aspects, the machine learning model can be configured to perform any suitable inferencing task on an inputted medical image. As a non-limiting example, the inferencing task can be image quality enhancement (e.g., to increase the visual quality of an inputted medical image). As another non-limiting example, the inferencing task can be image kernel transformation (e.g., to render an inputted medical image according to a different imaging kernel, such as a bone kernel or a soft tissue kernel). As yet another non-limiting example, the inferencing task can be image denoising (e.g., to reduce the amount of visual noise present in an inputted medical image). As still another non-limiting example, the inferencing task can be image segmentation (e.g., to determine to which class each pixel/voxel of an inputted medical image belongs). As even another non-limiting example, the inferencing task can be image classification (e.g., to determine to which class an inputted medical image, as a whole, belongs).

In any case, the machine learning model can be configured to receive a medical image as input and to produce an output corresponding to the inferencing task. For example, if the inferencing task is image quality enhancement, then the machine learning model can be configured to produce a quality-enhanced version of the inputted medical image. As another example, if the inferencing task is image kernel transformation, then the machine learning model can be configured to produce a kernel-transformed version of the inputted medical image. As still another example, if the inferencing task is image denoising, then the machine learning model can be configured to produce a denoised version of the inputted medical image. As yet another example, if the inferencing task is image segmentation, then the machine learning model can be configured to produce a segmentation mask for the inputted medical image. As even another example, if the inferencing task is image classification, then the machine learning model can be configured to produce a classification label for the inputted medical image.

However, rather than being configured to receive as input any given medical image alone, the machine learning model can be configured to receive as input the given medical image and a given set of equipment parameters corresponding to that given medical image (e.g., representing a user-controlled operational configuration of a medical imaging device that generated or captured that given medical image).

Accordingly, in various aspects, the execution component can electronically execute the machine learning model on the medical image and the set of equipment parameters that are accessed by the access component. In various instances, such execution can cause the machine learning model to generate an inferencing task output. As a non-limiting example, the machine learning model can exhibit a deep learning neural network architecture. In such case, the execution component can feed the medical image and the set of equipment parameters to an input layer of the machine learning model, the medical image and the set of equipment parameters can complete a forward pass through one or more hidden layers of the machine learning model, and an output layer of the machine learning model can compute the inferencing task output based on activations from the one or more hidden layers. More specifically still, in various aspects, a conditioning layer of the machine learning model can be in parallel with the input layer of the machine learning model. In such case, the execution component can feed the medical image to the input layer, the execution component can feed the set of equipment parameters to the conditioning layer, and activations from the input layer and the conditioning layer can complete forward passes through the one or more hidden layers and through the output layer, thereby yielding the inferencing task output. In various instances, the conditioning layer can be a Feature-wise Linear Modulation (FiLM) layer.

No matter the artificial intelligence architecture of the machine learning model, the execution component can feed the medical image and the set of equipment parameters to the machine learning model, which can cause the machine learning model to produce the inferencing task output.

In various aspects, a format or dimensionality of the inferencing task output can correspond to the inferencing task that the machine learning model is configured to perform. For example, if the inferencing task is image quality enhancement, then the inferencing task output can be considered as a quality-enhanced version of the medical image. As another example, if the inferencing task is image denoising, then the inferencing task output can be considered as a denoised-version of the medical image. As still another example, if the inferencing task is image kernel transformation, then the inferencing task output can be considered as a kernel-transformed version of the medical image. As yet another example, if the inferencing task is image segmentation, then the inferencing task output can be considered as a segmentation mask for the medical image. As even another example, if the inferencing task is image classification, then the inferencing task output can be considered as a classification label for the medical image.

In various embodiments, the result component of the computerized tool can electronically initiate any suitable electronic action based on the inferencing task output. For example, in various aspects, the result component can electronically transmit the inferencing task output, or any suitable portion thereof, to any suitable computing device. As another example, the result component can electronically render the inferencing task output, or any suitable portion thereof, on any suitable electronic display, screen, monitor, or graphical user-interface. As even another example, the result component can electronically generate or transmit an alert or warning, based on the inferencing task output or any suitable portion thereof.

To help cause the inferencing task output to be accurate, the machine learning model can first undergo any suitable type or paradigm of training (e.g., supervised training, unsupervised training, reinforcement learning). Accordingly, in various aspects, the access component can receive, retrieve, or otherwise access a training dataset, and the computerized tool can comprise a training component that can train the machine learning model on the training dataset.

In some instances, the training dataset can be an annotated training dataset. In such cases, the training dataset can include a set of training inputs and a set of ground-truth annotations that respectively correspond to the set of training inputs. In various aspects, a training input can include a training medical image (e.g., having the same format or dimensionality as the medical image discussed above) and a set of training equipment parameters (e.g., having the same format or dimensionality as the set of equipment parameters discussed above), where the set of training equipment parameters can represent a user-controlled operational configuration of whichever medical imaging device generated or captured the training medical image. In various instances, a ground-truth annotation can be considered as a correct or accurate inferencing task output that is known or deemed to correspond to a respective training input.

If the training dataset is annotated, then the training component can, in various aspects, perform supervised training on the machine learning model. Prior to the start of such supervised training, the internal parameters (e.g., weights, biases, convolutional kernels) of the machine learning model can be randomly initialized.

In various aspects, the training component can select from the training dataset any suitable training input and any suitable ground-truth annotation corresponding to such selected training input. In various instances, the training component can feed the selected training input to the machine learning model, which can cause the machine learning model to produce some output. For example, if the machine learning model is a deep learning neural network, then the training component can feed a training medical image specified in the selected training input to an input layer of the machine learning model, the training component can feed a set of training equipment parameters specified in the selected training input to a conditioning layer (e.g., FiLM) of the machine learning model, the training medical image and the set of training equipment parameters can complete a forward pass through one or more hidden layers of the machine learning model, and an output layer of the machine learning model can calculate the output based on activations from the one or more hidden layers.

In various aspects, the output can be considered as a prediction or inference (e.g., a predicted/inferred quality-enhanced image, a predicted/inferred kernel-transformed image, a predicted/inferred denoised image, a predicted/inferred segmentation mask, a predicted/inferred classification label) which the machine learning model believes should correspond to the selected training input. In contrast, the selected ground-truth annotation can be considered as a correct or accurate result (e.g., a correct/accurate quality-enhanced image, a correct/accurate kernel-transformed image, a correct/accurate denoised image, a correct/accurate segmentation mask, a correct/accurate classification label) that is known or deemed to correspond to the selected training input. Note that, if the machine learning model has so far undergone no or little training, then the output can be highly inaccurate (e.g., the output can be very different from the selected ground-truth annotation).

In any case, the training component can compute an error or loss (e.g., mean absolute error (MAE), mean squared error (MSE), cross-entropy) between the output and the selected ground-truth annotation. In various aspects, the training component can update the internal parameters of the machine learning model by performing backpropagation (e.g., stochastic gradient descent) driven by the computed error or loss.

In various instances, such supervised training procedure can be repeated for each training input in the training dataset, with the result being that the internal parameters of the machine learning model can become iteratively optimized to accurately generate predictions/inferences based on inputted medical images and inputted sets of equipment parameters. In various cases, the training component can implement any suitable training batch sizes, any suitable training termination criteria, or any suitable error, loss, or objective functions.

In other instances, the training dataset can be an unannotated training dataset. In such cases, the training dataset can include the set of training inputs but can lack the set of ground-truth annotations.

If the training dataset is unannotated, then the training component can, in various aspects, perform unsupervised or semi-supervised training on the machine learning model. Prior to the start of such unsupervised or semi-supervised training, the internal parameters (e.g., weights, biases, convolutional kernels) of the machine learning model can be randomly initialized.

In various aspects, the training component can select from the training dataset any suitable training input. In various instances, the training component can feed the selected training input to the machine learning model, which can cause the machine learning model to produce some output. As mentioned above, if the machine learning model is a deep learning neural network, then the training component can feed a training medical image specified in the selected training input to an input layer of the machine learning model, the training component can feed a set of training equipment parameters specified in the selected training input to a conditioning layer (e.g., FiLM) of the machine learning model, the training medical image and the set of training equipment parameters can complete a forward pass through one or more hidden layers of the machine learning model, and an output layer of the machine learning model can calculate the output based on activations from the one or more hidden layers.

As above, the output can be considered as a prediction or inference (e.g., a predicted/inferred quality-enhanced image, a predicted/inferred kernel-transformed image, a predicted/inferred denoised image, a predicted/inferred segmentation mask, a predicted/inferred classification label) which the machine learning model believes should correspond to the selected training input.

In various aspects, the training component can compute an error or loss, where such error or loss can be a function of the output and of the selected training input (e.g., of the training medical image and of the set of training equipment parameters specified in the selected training input). As a non-limiting example, suppose that the inferencing task is image deconvolution, and suppose that the set of training equipment parameters include a point-spread function that a medical imaging device utilized to generate or capture the training medical image. In such case, the training component can convolve the output of the machine learning model with the point-spread function, and the training component can compute an error or loss (e.g., MAE, MSE, cross-entropy) between the result of that convolution and the training medical image. In any case, the training component can update the internal parameters of the machine learning model by performing backpropagation (e.g., stochastic gradient descent) driven by the computed error or loss.

In various instances, such unsupervised or semi-supervised training procedure can be repeated for each training input in the training dataset, with the result being that the internal parameters of the machine learning model can become iteratively optimized to accurately generate predictions/inferences based on inputted medical images and inputted sets of equipment parameters. Again, the training component can implement any suitable training batch sizes, any suitable training termination criteria, or any suitable error, loss, or objective functions.

In any case, the machine learning model can be configured or otherwise trained to receive as input both a medical image and a corresponding set of equipment parameters implemented by a medical imaging device to generate or capture the medical image, and to perform as output an inferencing task based on both that medical image and that set of equipment parameters. In other words, the machine learning model can be considered as explicitly taking into consideration the set of equipment parameters according to which any given inputted medical image was generated or captured. By being trained to explicitly receive as input such equipment parameters, the machine learning model can be considered as learning how variations in equipment parameters can influence or otherwise affect outputted predictions/inferences. In other words, the internal parameters of the machine learning model can, after training, be considered as adjusting how any given medical image is analyzed, based on the set of equipment parameters according to which that given medical image was generated or captured.

For example, suppose that the machine learning model is fed a first medical image and a first set of equipment parameters, thereby yielding a first inferencing task output. Now, if the machine learning model is fed that same first medical image and a second set of equipment parameters that are different from the first set of equipment parameters, then the machine learning model can generate a second inferencing task output that is different from the first inferencing task output. That is, the second inferencing task output can be different from the first inferencing task output, notwithstanding that they can both be based on the first medical image. Accordingly, how the machine learning model analyzes any given medical image can depend upon the set of equipment parameters of whichever medical imaging device generated or captured that given medical image.

Because the machine learning model can explicitly receive user-controllable equipment parameters as input, the machine learning model can be applied across different sets of equipment parameters without suffering from globally-averaged performance over such different sets of equipment parameters, unlike existing techniques.

Various embodiments described herein can be employed to use hardware or software to solve problems that are highly technical in nature (e.g., to facilitate machine learning image analysis via explicit equipment parameters), that are not abstract and that cannot be performed as a set of mental acts by a human. Further, some of the processes performed can be performed by a specialized computer (e.g., a machine learning model having internal parameters such as convolutional kernels) for carrying out defined tasks related to machine learning image analysis based on explicit equipment parameters. For example, such defined tasks can include: accessing, by a device operatively coupled to a processor, a medical image generated by a medical imaging device; and performing, by the device and via execution of a machine learning model, an inferencing task on the medical image, wherein the machine learning model receives as input the medical image and a set of equipment parameters, and wherein the set of equipment parameters indicate how the medical imaging device was configured to generate the medical image.

Such defined tasks are not performed manually by humans. Indeed, neither the human mind nor a human with pen and paper can electronically access a medical image (e.g., a two-dimensional pixel array, a three-dimensional voxel array) and a set of equipment parameters describing a user-controllable operational configuration of a medical imaging device that generated the medical image, and electronically execute a machine learning model (e.g., a deep learning neural network) on both the medical image and the set of equipment parameters, so as to perform an inferencing task on the medical image. Indeed, a machine learning model is an inherently-computerized construct that simply cannot be implemented in any way by the human mind without computers. Accordingly, a computerized tool that can train or execute a deep learning neural network on both a medical image and a set of equipment parameters representing how a medical imaging device generated or captured the medical image is likewise inherently-computerized and cannot be implemented in any sensible, practical, or reasonable way without computers.

Moreover, various embodiments described herein can integrate into a practical application various teachings relating to machine learning image analysis based on explicit equipment parameters. As explained above, some existing techniques train a machine learning model on medical images all of which were generated or captured according to a common, uniform set of equipment parameters. In such cases, the machine learning model cannot be reliably applied to any medical image that was not generated or captured according to that common, uniform set of equipment parameters, which can be considered as a disadvantage. As also explained above, other existing techniques train a machine learning model on medical images that were generated or captured according to different sets of equipment parameters. In such cases, the machine learning model can be applied across different sets of equipment parameters. However, in such cases, the performance (e.g., accuracy) of the machine learning model can be globally-averaged, or otherwise not as high as it otherwise might be, across such different sets of equipment parameters, which can be considered as a disadvantage.

Various embodiments described herein can address these technical problems. Specifically, the present inventors realized that various disadvantages of the above-mentioned existing techniques can be caused by the fact that such existing techniques account for equipment parameters in a solely implicit fashion. Indeed, the present inventors realized that such disadvantages can be ameliorated by configuring or training a machine learning model to explicitly receive as input not just a medical image but also a set of equipment parameters according to which the medical image was generated or captured. By receiving the set of equipment parameters as explicit input features, the machine learning model can, during training, be considered as learning how variations in equipment parameters correlate to variations in inferred/predicted output. Thus, the machine learning model be applied across different sets of equipment parameters (e.g., unlike existing techniques that train only on medical images corresponding to a uniform/common set of equipment parameters) and can exhibit heightened performance (e.g., heightened accuracy) for each of such different sets of equipment parameters (e.g., unlike existing techniques that train on medical images corresponding to different sets of equipment parameters). Thus, various embodiments described herein certainly constitute a concrete and tangible technical improvement in the field of machine learning. Therefore, various embodiments described herein clearly qualify as useful and practical applications of computers.

Furthermore, various embodiments described herein can control real-world tangible devices based on the disclosed teachings. For example, various embodiments described herein can electronically execute (or train) real-world machine learning models on real-world medical images (e.g., CT images, MRI images, X-ray images, PET images, ultrasound images), and can electronically render any results produced by such real-world machine learning models on real-world computer screens.

It should be appreciated that the herein figures and description provide non-limiting examples of various embodiments and are not necessarily drawn to scale.

FIG. 1 illustrates a block diagram of an example, non-limiting system 100 that can facilitate machine learning image analysis based on explicit equipment parameters in accordance with one or more embodiments described herein. As shown, an image analysis system 102 can be electronically integrated, via any suitable wired or wireless electronic connections, with a medical image 104 or with a medical imaging device 106.

In various embodiments, the medical image 104 can be any suitable image data that depicts any suitable anatomical structure of any suitable medical patient. As some non-limiting examples, the anatomical structure can be any suitable tissue of the medical patient (e.g., bone tissue, lung tissue, muscle tissue), any suitable organ of the medical patient (e.g., heart, liver, lung, brain), any suitable bodily fluid of the medical patient (e.g., blood, amniotic fluid), any other suitable body part of the medical patient, or any suitable portion thereof.

In various aspects, the medical image 104 can have any suitable format or dimensionality. As a non-limiting example, the medical image 104 can be an x-by-y pixel array of Hounsfield unit values, for any suitable positive integers x and y. As another non-limiting example, the medical image 104 can be an x-by-y-by-z voxel array of Hounsfield unit values, for any suitable positive integers x, y, and z.

In various embodiments, the medical image 104 can be generated or otherwise captured by the medical imaging device 106. In various aspects, the medical imaging device 106 can be any suitable image-generation or image-capturing modality. As a non-limiting example, the medical imaging device 106 can be a CT scanner, in which case the medical image 104 can be considered as a CT scanned image. As another non-limiting example, the medical imaging device 106 can be an MRI scanner, in which case the medical image 104 can be considered as an MRI scanned image. As yet another non-limiting example, the medical imaging device 106 can be a PET scanner, in which case the medical image 104 can be considered as a PET scanned image. As even another non-limiting example, the medical imaging device 106 can be an X-ray scanner, in which case the medical image 104 can be considered as an X-ray scanned image. As still another non-limiting example, the medical imaging device 106 can be an ultrasound scanner, in which case the medical image 104 can be considered as an ultrasound scanned image. As another non-limiting example, the medical imaging device 106 can be a visible-spectrum camera, in which case the medical image 104 can be considered as an image photographed in the visible spectrum.

In various embodiments, the medical imaging device 106 can generate or capture the medical image 104 according to a set of equipment parameters 108. In various aspects, the set of equipment parameters 108 can include m parameters for any suitable positive integer m: an equipment parameter 1 to an equipment parameter m. In various instances, an equipment parameter can be any suitable piece of electronic data that indicates, conveys, denotes, or otherwise represents any suitable user-controllable or user-configurable setting, property, characteristic, or attribute which the medical imaging device 106 implemented to generate or capture the medical image 104. As a non-limiting example, an equipment parameter can be or otherwise represent a user-specified point-spread function which the medical imaging device 106 utilized to generate or capture the medical image 104. As another non-limiting example, an equipment parameter can be or otherwise represent a user-specified acquisition frequency which the medical imaging device 106 utilized to generate or capture the medical image 104. As yet another non-limiting example, an equipment parameter can be or otherwise represent a user-specified focus depth which the medical imaging device 106 utilized to generate or capture the medical image 104. As still another non-limiting example, an equipment parameter can be or otherwise represent a user-specified focal spot size which the medical imaging device 106 utilized to generate or capture the medical image 104. As even another non-limiting example, an equipment parameter can be or otherwise represent a user-specified time-gain compensation which the medical imaging device 106 utilized to generate or capture the medical image 104. As another non-limiting example, an equipment parameter can be or otherwise represent a user-specified line density which the medical imaging device 106 utilized to generate or capture the medical image 104. As yet another non-limiting example, an equipment parameter can be or otherwise represent a user-specified dose strength (e.g., as measured in radiation, amperage, or voltage) which the medical imaging device 106 utilized to generate or capture the medical image 104. As still another non-limiting example, an equipment parameter can be or otherwise represent a user-specified gantry step size which the medical imaging device 106 utilized to generate or capture the medical image 104. As even another non-limiting example, an equipment parameter can be or otherwise represent a user-specified image reconstruction technique which the medical imaging device 106 utilized to generate or capture the medical image 104.

Although the herein disclosure mainly describes various embodiments of an equipment parameter as being a user-specifiable, user-controllable, or user-configurable setting of the medical imaging device 106, this is a mere non-limiting example. In some cases, an equipment parameter can be any suitable property, characteristic, or attribute of the medical imaging device 106 that is fixed or otherwise not user-specifiable, not user-controllable, or not user-configurable.

In various aspects, an equipment parameter can exhibit any suitable format, size, or dimensionality. That is, an equipment parameter can be one or more scalars, one or more vector, one or more matrices, one or more tensors, or one or more character strings. In various instances, different ones of the set of equipment parameters 108 can have the same or different formats, sizes, or dimensionalities than each other.

In some aspects, an equipment parameter can be any suitable hardware-based, user-configurable setting of the medical imaging device 106. In other aspects, an equipment parameter can be any suitable software-based, user-configurable setting of the medical imaging device 106.

Note that, in various aspects, the set of equipment parameters 108 can lack any property, characteristic, or attribute of the medical imaging device 106 that is not user-controllable, user-configurable, or user-specifiable. A non-limiting example of such non-controllable, non-configurable, or non-specifiable properties, characteristics, or attributes can be an amount of optical noise or optical degradation exhibited by the medical imaging device 106 or any metric approximating such optical noise or optical degradation (e.g., a blur kernel).

In any case, the set of equipment parameters 108 can be considered as collectively representing, indicating, or conveying a user-controlled operational configuration that the medical imaging device 106 utilized to create the medical image 104 (e.g., can be considered as denoting how a user or technician had configured the medical imaging device 106 so as to generate or capture the medical image 104).

In various embodiments, the image analysis system 102 can comprise a processor 110 (e.g., computer processing unit, microprocessor) and a non-transitory computer-readable memory 112 that is operably or operatively or communicatively connected or coupled to the processor 110. The non-transitory computer-readable memory 112 can store computer-executable instructions which, upon execution by the processor 110, can cause the processor 110 or other components of the image analysis system 102 (e.g., access component 114, execution component 116, result component 118) to perform one or more acts. In various embodiments, the non-transitory computer-readable memory 112 can store computer-executable components (e.g., access component 114, execution component 116, result component 118), and the processor 110 can execute the computer-executable components.

In various embodiments, the image analysis system 102 can comprise an access component 114. In various aspects, the access component 114 can electronically receive or otherwise electronically access the medical image 104 or the set of equipment parameters 108. In various instances, the access component 114 can electronically retrieve the medical image 104 or the set of equipment parameters 108 from any suitable centralized or decentralized data structures (not shown) or from any suitable centralized or decentralized computing devices (not shown). As a non-limiting example, the medical imaging device 106 can transmit the medical image 104 or the set of equipment parameters 108 to the access component 114. In any case, the access component 114 can electronically obtain or access the medical image 104 or the set of equipment parameters 108, such that other components of the image analysis system 102 can electronically interact with the medical image 104 or with the set of equipment parameters 108.

In various embodiments, the image analysis system 102 can comprise an execution component 116. In various aspects, as described herein, the execution component 116 can execute a machine learning model on both the medical image 104 and the set of equipment parameters 108, thereby yielding an inferencing task result.

In various embodiments, the image analysis system 102 can comprise a result component 118. In various instances, as described herein, the result component 118 can transmit the inferencing task result to any suitable computing devices, or can render the inferencing task result on any suitable computer display.

Figure 2:
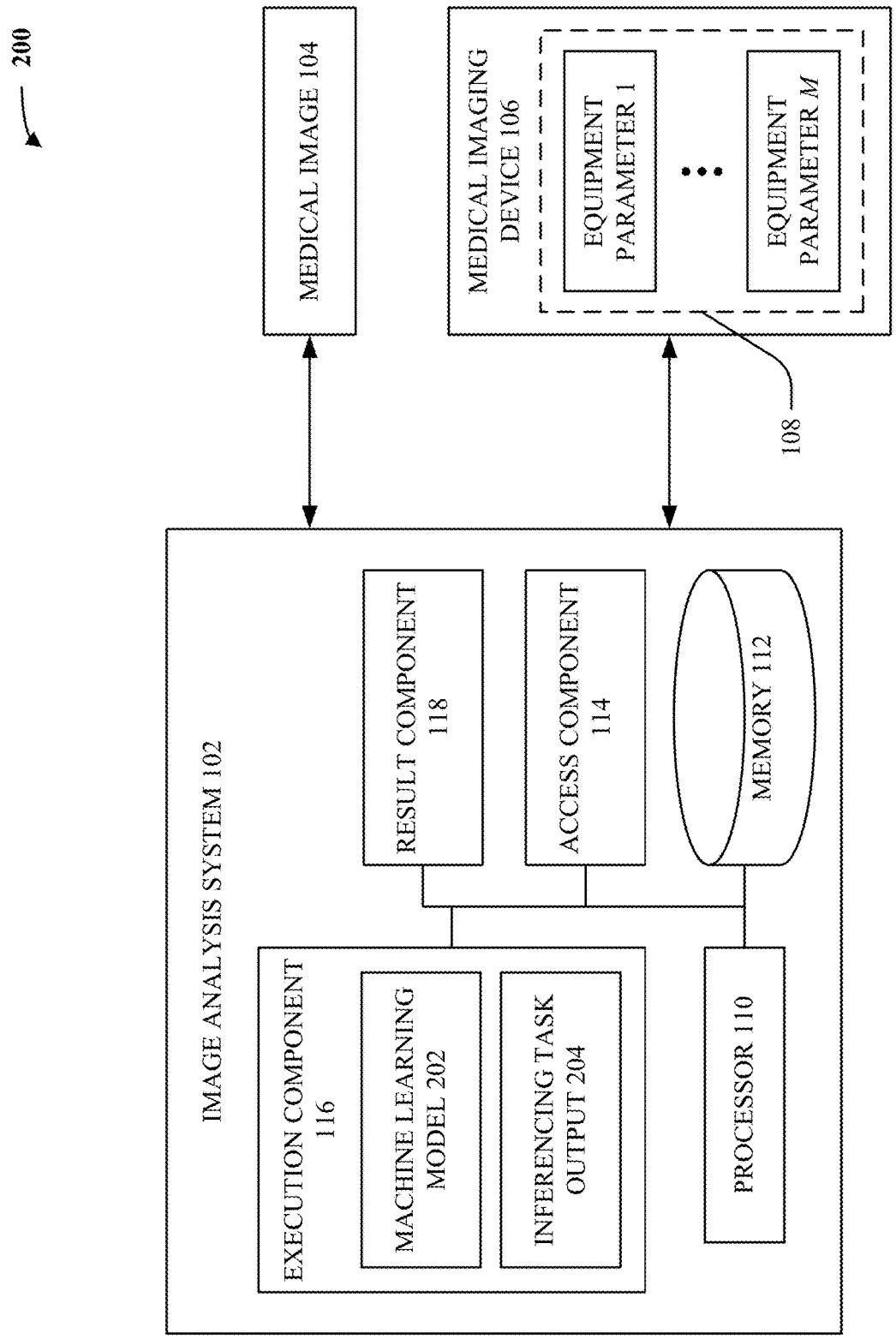
FIG. 2 illustrates a block diagram of an example, non-limiting system including a machine learning model and an inferencing task output that facilitates machine learning image analysis based on explicit equipment parameters in accordance with one or more embodiments described herein.

FIG. 2 illustrates a block diagram of an example, non-limiting system 200 including a machine learning model and an inferencing task output that can facilitate machine learning image analysis based on explicit equipment parameters in accordance with one or more embodiments described herein. As shown, the system 200 can, in some cases, comprise the same components as the system 100, and can further comprise a machine learning model 202 and an inferencing task output 204.

In various embodiments, the execution component 116 can electronically store, electronically maintain, electronically control, or otherwise electronically access the machine learning model 202. In various aspects, the machine learning model 202 can have or otherwise exhibit any suitable artificial intelligence architecture. As a non-limiting example, the machine learning model 202 can have or otherwise exhibit a deep learning neural network architecture. As another non-limiting example, the machine learning model 202 can have or otherwise exhibit a support vector machine architecture. As yet another non-limiting example, the machine learning model 202 can have or otherwise exhibit a naïve Bayes architecture. As still another non-limiting example, the machine learning model 202 can have or otherwise exhibit a linear or logistic regression architecture. As even another non-limiting example, the machine learning model 202 can have or otherwise exhibit a decision tree architecture.

No matter the internal architecture of the machine learning model 202, the machine learning model 202 can be configured to perform any suitable inferencing task on inputted medical images. As a non-limiting example, the inferencing task can be image quality enhancement. As another non-limiting example, the inferencing task can be image denoising. As yet another non-limiting example, the inferencing task can be image kernel transformation. As still another non-limiting example, the inferencing task can be image deconvolution. As even another non-limiting example, the inferencing task can be image segmentation. As another non-limiting example, the inferencing task can be image classification.

No matter the internal architecture of the machine learning model 202, and no matter the inferencing task performable by the machine learning model 202, the machine learning model 202 can be configured to receive as input both a medical image and a set of user-specified equipment parameters implemented by a medical imaging device to generate or capture such medical image. Accordingly, in various aspects, the execution component 116 can electronically execute the machine learning model 202 on both the medical image 104 and the set of equipment parameters 108, which can cause the machine learning model 202 to produce the inferencing task output 204. Various non-limiting aspects are further discussed with respect to FIGS. 3-4.

Figure 3:
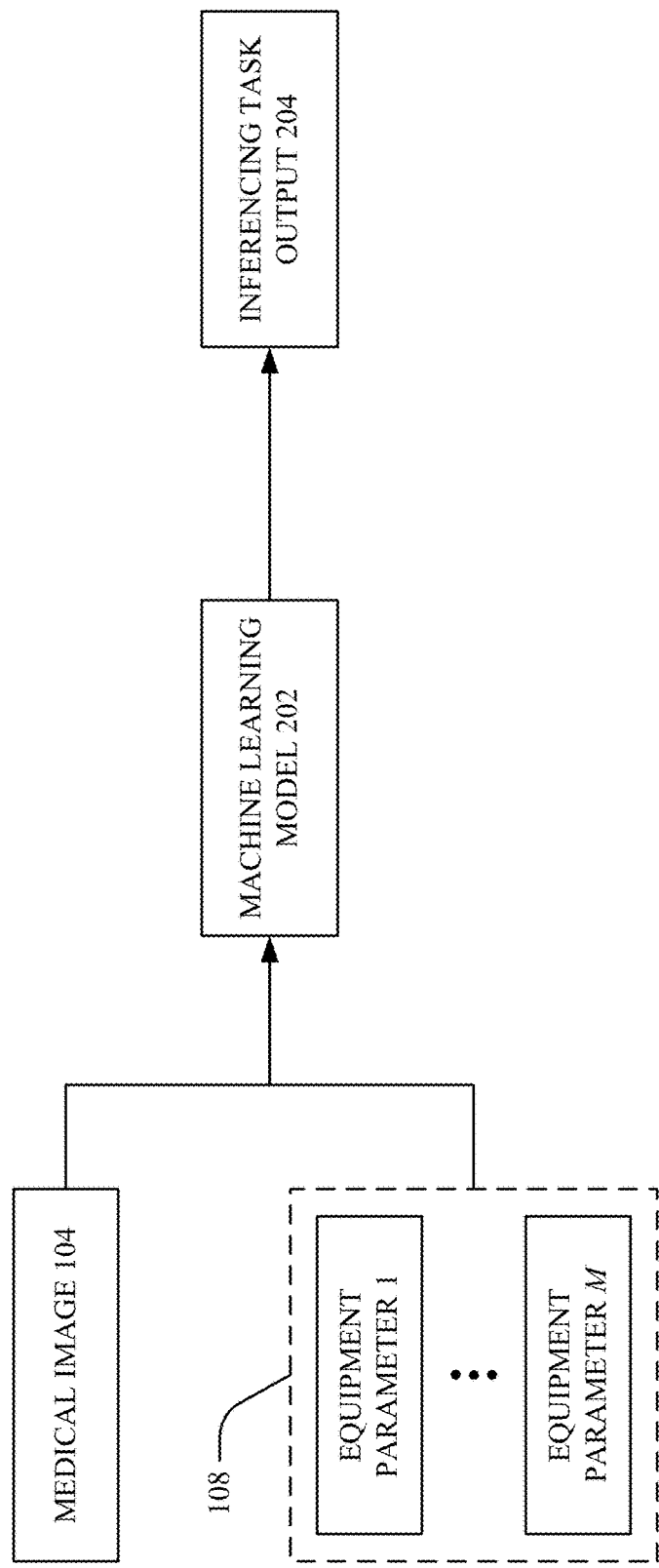
FIGS. 3-4 illustrate example, non-limiting block diagrams showing how a machine learning model can generate an inferencing task output in accordance with one or more embodiments described herein.
Figure 4:
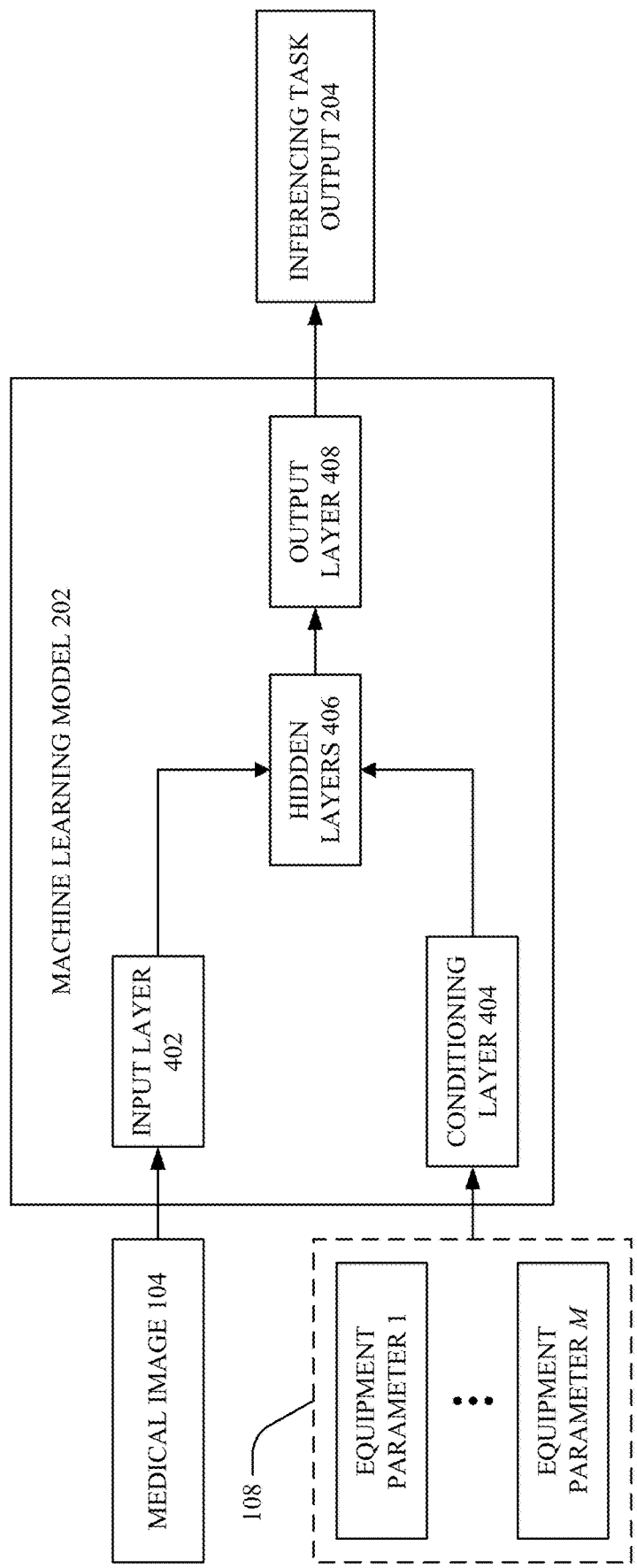

FIGS. 3-4 illustrate example, non-limiting block diagrams 300 and 400 showing how the machine learning model 202 can generate the inferencing task output 204 in accordance with one or more embodiments described herein.

First, consider FIG. 3. As shown, the execution component 116 can, in various aspects, feed both the medical image 104 and the set of equipment parameters 108 as input to the machine learning model 202. In other words, the machine learning model 202 can be configured to receive the medical image 104 as an explicit input feature and can be configured to receive the set of equipment parameters 108 as additional explicit input features. In various instances, both the medical image 104 (e.g., which can be a pixel array or a voxel array) and the set of equipment parameters 108 (e.g., each of which can be any suitable number of scalars, vectors, matrices, tensors, or character strings denoting user-controllable settings of the medical imaging device 106) can complete forward passes through the internal architecture of the machine learning model 202, which can cause the machine learning model 202 to produce the inferencing task output 204 as a result.

In various aspects, the inferencing task output 204 can be any suitable electronic data whose format, size, or dimensionality can depend upon the inferencing task that the machine learning model 202 is configured to perform. As a non-limiting example, if the inferencing task is image quality enhancement, then the inferencing task output 204 can be considered as a quality-enhanced version of the medical image 104. As another non-limiting example, if the inferencing task is image denoising, then the inferencing task output 204 can be considered as a denoised version of the medical image 104. As still another non-limiting example, if the inferencing task is image kernel transformation, then the inferencing task output 204 can be considered as a kernel-transformed version of the medical image 104. As even another non-limiting example, if the inferencing task is image deconvolution, then the inferencing task output 204 can be considered as a deconvolved version of the medical image 104. As yet another non-limiting example, if the inferencing task is image segmentation, then the inferencing task output 204 can be considered as a segmentation mask of the medical image 104. As another non-limiting example, if the inferencing task is image classification, then the inferencing task output 204 can be considered as a classification label of the medical image 104.

In any case, the inferencing task output 204 can be considered as not being a mere function of the medical image 104 alone. Instead, because the machine learning model 202 can explicitly receive both the medical image 104 and the set of equipment parameters 108, the inferencing task output 204 can be considered as being a function of (e.g., can be considered as depending upon) both the medical image 104 and the set of equipment parameters 108. In other words, the inferencing task output 204 can, in various cases, be altered by changes in the set of equipment parameters 108, even if no changes are made to the medical image 104.

In various aspects, the machine learning model 202 can be configured to receive as input both the medical image 104 and the set of equipment parameters 108, regardless of the internal architecture exhibited by the machine learning model 202 (e.g., regardless of whether the machine learning model 202 is a deep learning neural network, is a support vector machine, is a naïve Bayes model, is a linear or logistic regression model, or is a decision tree model). However, in some non-limiting instances, the machine learning model 202 can be a deep learning neural network, as described with respect to FIG. 4.

As shown in FIG. 4, in cases where the machine learning model 202 is a deep learning neural network, the machine learning model 202 can, in various aspects, comprise an input layer 402, a conditioning layer 404, a set of hidden layers 406, or an output layer 408.

In various instances, the input layer 402 can be any suitable type of neural network layer having any suitable trainable or fixed internal parameters. As a non-limiting example, the input layer 402 can be a dense layer having any suitable number of neurons, with each neuron having any suitable activation function, any suitable trainable weights, or any suitable trainable biases. As another non-limiting example, the input layer 402 can be a convolutional layer having any suitable number of trainable convolutional kernels, with each trainable convolutional kernel having any suitable format, size, or dimensionality.

In various cases, the set of hidden layers 406 can include any suitable number of hidden layers. In various aspects, a hidden layer can be any suitable type of neural network layer having any suitable trainable or fixed internal parameters. As a non-limiting example, a hidden layer can be a dense layer having any suitable number of neurons, with each neuron having any suitable activation function, any suitable trainable weights, or any suitable trainable biases. As another non-limiting example, a hidden layer can be a convolutional layer having any suitable number of trainable convolutional kernels, with each trainable convolutional kernel having any suitable format, size, or dimensionality. As still other non-limiting examples, a hidden layer can be a pooling layer, a batch normalization layer, a padding layer, a concatenation layer, or a non-linearity layer, any of which can have any suitable fixed (e.g., untrainable) internal parameters.

Likewise, in various instances, the output layer 408 can be any suitable type of neural network layer having any suitable trainable or fixed internal parameters. As a non-limiting example, the output layer 408 can be a dense layer having any suitable number of neurons, with each neuron having any suitable activation function, any suitable trainable weights, or any suitable trainable biases. As another non-limiting example, the output layer 408 can be a convolutional layer having any suitable number of trainable convolutional kernels, with each trainable convolutional kernel having any suitable format, size, or dimensionality. As still other non-limiting examples, the output layer 408 can be a pooling layer, a batch normalization layer, a padding layer, a concatenation layer, or a non-linearity layer, any of which can have any suitable fixed (e.g., untrainable) internal parameters.

In various aspects, the conditioning layer 404 can be any suitable type of neural network conditioning layer having any suitable number of neurons or otherwise having any suitable trainable or fixed internal parameters. As a non-limiting example, the conditioning layer 404 can be a Feature-wise Linear Modulation (FiLM) layer.

In various instances, any suitable types or arrangements of interlayer connections (e.g., forward connections, skip connections, recurrent connections) can be implemented in the machine learning model 202 so as to couple the input layer 402, the conditioning layer 404, the set of hidden layers 406, or the output layer 408 together. As a non-limiting example, the input layer 402 can be coupled via any suitable forward connections to a first (e.g., most upstream) hidden layer in the set of hidden layers 406, or the input layer 402 can be coupled via any suitable skip connections to any other hidden layers in the set of hidden layers 406. As another non-limiting example, the conditioning layer 404 be coupled via any suitable forward connections to a first (e.g., most upstream) hidden layer in the set of hidden layers 406, or the conditioning layer 404 can be coupled via any suitable skip connections to any other hidden layers in the set of hidden layers 406. Although not explicitly shown in FIG. 4, the input layer 402 can be coupled via any suitable skip connections to the output layer 408. Likewise, although not explicitly shown in FIG. 4, the conditioning layer 404 can be coupled via any suitable skip connections to the output layer 408.

In various aspects, the execution component 116 can electronically feed the medical image 104 to the input layer 402, the execution component 116 can electronically feed the set of equipment parameters 108 to the conditioning layer 404, and both the medical image 104 and the set of equipment parameters 108 can complete a forward pass through the machine learning model 202. More specifically, the input layer 402 can generate various activation maps (not shown) based on the medical image 104. Likewise, the conditioning layer 404 can generate various other activation maps (not shown) based on the set of equipment parameters 108. In various instances, the activation maps from the input layer 402 and the other activation maps from the conditioning layer 404 can pass through the set of hidden layers 406 (e.g., according to whatever interlayer connections are implemented by the machine learning model 202). Accordingly, the set of hidden layers 406 can provide their own activation maps (not shown) to the output layer 408. In various cases, the output layer 408 can compute the inferencing task output 204 based on the activation maps generated by the set of hidden layers 406 (or also based on activations from the input layer 402 or from the conditioning layer 404, if the input layer 402 or the conditioning layer 404 are coupled to the output layer 408 via skip connections).

In any case, the execution component 116 can electronically execute the machine learning model 202 on both the medical image 104 and the set of equipment parameters 108, thereby yielding the inferencing task output 204.

Referring back to FIG. 2, the result component 118 can, in various embodiments, initiate any suitable electronic actions based on the inferencing task output 204. As a non-limiting example, the result component 118 can electronically transmit the inferencing task output 204 to any suitable computing device (not shown), so as to notify a user or technician that the inferencing task output 204 has been generated. As another non-limiting example, the result component 118 can electronically render the inferencing task output 204 on any suitable computer screen, computer monitor, computer display, or graphical user-interface (not shown), so as to allow a user or technician to visually inspect the inferencing task output 204.

To help ensure that the inferencing task output 204 is accurate, the machine learning model 202 can first undergo training. Various non-limiting aspects of such training are described with respect to FIGS. 5-9.

Figure 5:
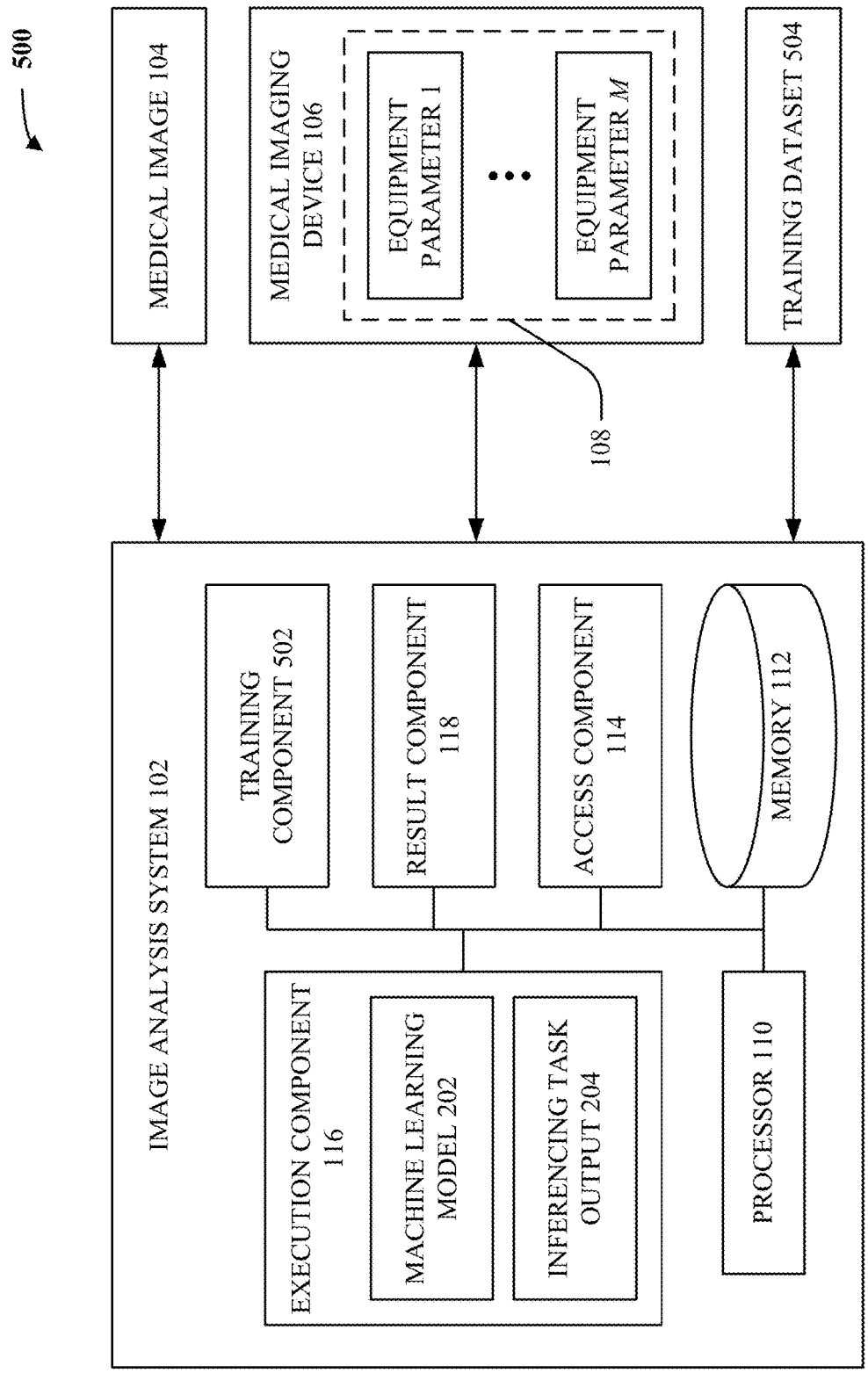
FIG. 5 illustrates a block diagram of an example, non-limiting system including a training component and a training dataset that facilitates machine learning image analysis based on explicit equipment parameters in accordance with one or more embodiments described herein.

FIG. 5 illustrates a block diagram of an example, non-limiting system 500 including a training component and a training dataset that can facilitate machine learning image analysis based on explicit equipment parameters in accordance with one or more embodiments described herein. As shown, the system 500 can, in some cases, comprise the same components as the system 200, and can further comprise a training component 502 or a training dataset 504.

In various embodiments, the access component 114 can electronically receive, retrieve, obtain, or otherwise access, from any suitable source, the training dataset 504. In various aspects, the training component 502 can train the machine learning model 202 based on the training dataset 504. In some cases, the training dataset 504 can be annotated, and so the training component 502 can perform supervised training on the machine learning model 202, as described with respect to FIGS. 6-7. In other cases, the training dataset 504 can be unannotated, and so the training component 502 can perform unsupervised or semi-supervised training on the machine learning model 202, as described with respect to FIGS. 8-9.

Figure 6:
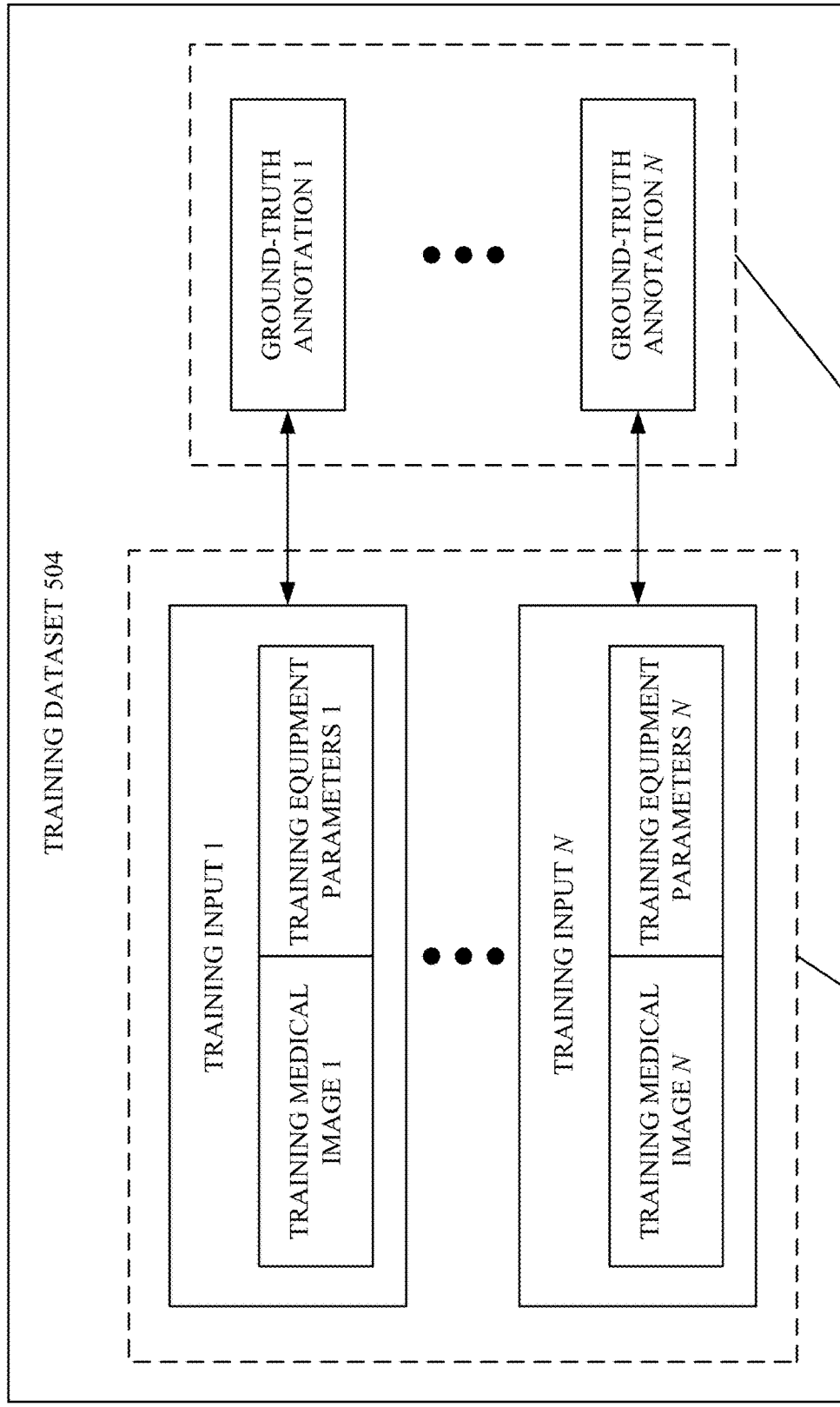
FIGS. 6-9 illustrate example, non-limiting block diagrams showing how a machine learning model can be trained in accordance with one or more embodiments described herein.

First, consider FIG. 6. As shown, FIG. 6 illustrates a block diagram 600 showing an example, non-limiting embodiment of the training dataset 504. More specifically, as shown in the non-limiting example of FIG. 6, the training dataset 504 can be an annotated training dataset. In such case, the training dataset 504 can comprise a set of training inputs 602 and a set of ground-truth annotations 604.

In various aspects, the set of training inputs 602 can include n inputs for any suitable positive integer n: a training input 1 to a training input n. In various instances, a training input can be any suitable piece of electronic data that includes both a training medical image and a set of training equipment parameters that correspond to such training medical image.

For example, the training input 1 can include a training medical image 1 and a set of training equipment parameters 1. In various cases, the training medical image 1 can have the same format, size, or dimensionality as the medical image 104 (e.g., if the medical image 104 is an x-by-y pixel array, then the training medical image 1 can likewise be an x-by-y pixel array; if the medical image 104 is instead an x-by-y-by-z voxel array, then the training medical image 1 can be likewise be an x-by-y-by-z voxel array). Similarly, the set of training equipment parameters 1 can have the same size, format, or dimensionality as the set of equipment parameters 108 (e.g., since the set of equipment parameters 108 can have m equipment parameters, the set of training equipment parameters 1 can likewise have m equipment parameters). Accordingly, the training medical image 1 can be any suitable medical image on which the inferencing task is performable, and the set of training equipment parameters 1 can collectively indicate or represent a user-specified operational configuration of whichever medical imaging device generated or captured the training medical image 1.

As another example, the training input n can include a training medical image n and a set of training equipment parameters n. In various cases, the training medical image n can have the same format, size, or dimensionality as the medical image 104 (e.g., if the medical image 104 is an x-by-y pixel array, then the training medical image n can likewise be an x-by-y pixel array; if the medical image 104 is instead an x-by-y-by-z voxel array, then the training medical image n can be likewise be an x-by-y-by-z voxel array). Similarly, the set of training equipment parameters n can have the same size, format, or dimensionality as the set of equipment parameters 108 (e.g., since the set of equipment parameters 108 can have m equipment parameters, the set of training equipment parameters n can likewise have m equipment parameters). Accordingly, the training medical image n can be any suitable medical image on which the inferencing task is performable, and the set of training equipment parameters n can collectively indicate or represent a user-specified operational configuration of whichever medical imaging device generated or captured the training medical image n.

In various aspects, the set of ground-truth annotations 604 can respectively correspond (e.g., in one-to-one fashion) to the set of training inputs 602. Thus, since the set of training inputs 602 can have n inputs, the set of ground-truth annotations can have n annotations: a ground-truth annotation 1 to a ground-truth annotation n. In various instances, each of the set of ground-truth annotations 604 can be any suitable electronic data that indicates or represents an inferencing task result that would be achieved if the inferencing task were correctly or accurately performed on a respective one of the set of training inputs 602.

Indeed, in various aspects, the ground-truth annotation 1 can correspond to the training input 1. Accordingly, the ground-truth annotation 1 can be considered as representing the correct or accurate inferencing task result that is known or otherwise deemed to correspond to the training input 1. As a non-limiting example, if the inferencing task is image quality enhancement, then the ground-truth annotation 1 can be the correct/accurate quality-enhanced image that is known or deemed to correspond to the training medical image 1 given that the training medical image 1 is generated or captured according to the set of training equipment parameters 1. As another non-limiting example, if the inferencing task is image kernel transformation, then the ground-truth annotation 1 can be the correct/accurate kernel-transformed image that is known or deemed to correspond to the training medical image 1 given that the training medical image 1 is generated or captured according to the set of training equipment parameters 1. As yet another non-limiting example, if the inferencing task is image denoising, then the ground-truth annotation 1 can be the correct/accurate denoised image that is known or deemed to correspond to the training medical image 1 given that the training medical image 1 is generated or captured according to the set of training equipment parameters 1. As still another non-limiting example, if the inferencing task is image deconvolution, then the ground-truth annotation 1 can be the correct/accurate deconvolved image that is known or deemed to correspond to the training medical image 1 given that the training medical image 1 is generated or captured according to the set of training equipment parameters 1. As even another non-limiting example, if the inferencing task is image segmentation, then the ground-truth annotation 1 can be the correct/accurate segmentation mask that is known or deemed to correspond to the training medical image 1 given that the training medical image 1 is generated or captured according to the set of training equipment parameters 1. As another non-limiting example, if the inferencing task is image classification, then the ground-truth annotation 1 can be the correct/accurate classification label that is known or deemed to correspond to the training medical image 1 given that the training medical image 1 is generated or captured according to the set of training equipment parameters 1.

Furthermore, in various instances, the ground-truth annotation n can correspond to the training input n. Accordingly, the ground-truth annotation n can be considered as representing the correct or accurate inferencing task result that is known or otherwise deemed to correspond to the training input n. As a non-limiting example, if the inferencing task is image quality enhancement, then the ground-truth annotation n can be the correct/accurate quality-enhanced image that is known or deemed to correspond to the training medical image n given that the training medical image n is generated or captured according to the set of training equipment parameters n. As another non-limiting example, if the inferencing task is image kernel transformation, then the ground-truth annotation n can be the correct/accurate kernel-transformed image that is known or deemed to correspond to the training medical image n given that the training medical image n is generated or captured according to the set of training equipment parameters n. As yet another non-limiting example, if the inferencing task is image denoising, then the ground-truth annotation n can be the correct/accurate denoised image that is known or deemed to correspond to the training medical image n given that the training medical image n is generated or captured according to the set of training equipment parameters n. As still another non-limiting example, if the inferencing task is image deconvolution, then the ground-truth annotation n can be the correct/accurate deconvolved image that is known or deemed to correspond to the training medical image n given that the training medical image n is generated or captured according to the set of training equipment parameters n. As even another non-limiting example, if the inferencing task is image segmentation, then the ground-truth annotation n can be the correct/accurate segmentation mask that is known or deemed to correspond to the training medical image n given that the training medical image n is generated or captured according to the set of training equipment parameters n. As another non-limiting example, if the inferencing task is image classification, then the ground-truth annotation n can be the correct/accurate classification label that is known or deemed to correspond to the training medical image n given that the training medical image n is generated or captured according to the set of training equipment parameters n.

Figure 7:
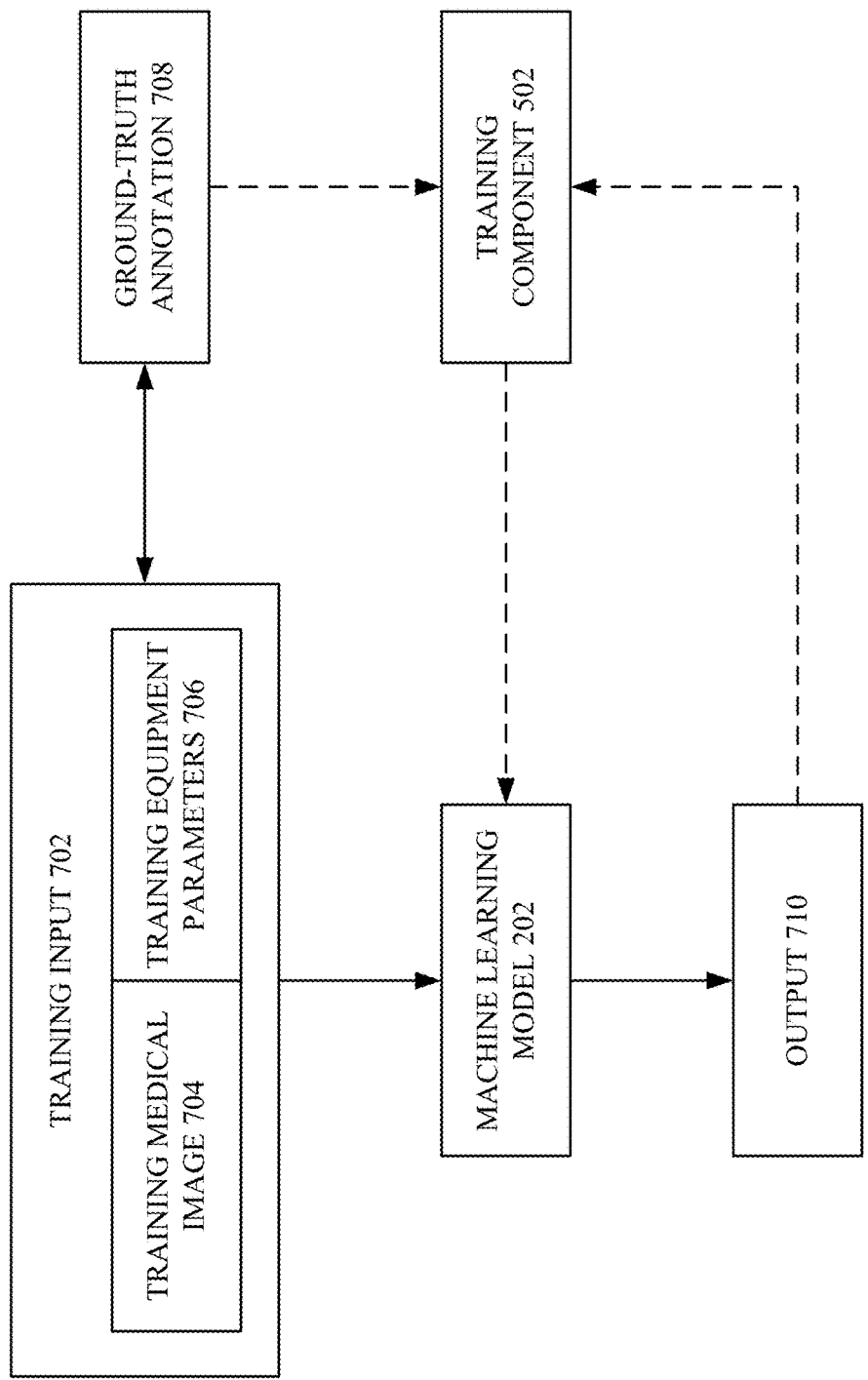

Now, consider FIG. 7. As shown, FIG. 7 illustrates a block diagram 700 showing how the machine learning model 202 can be trained in supervised fashion based on the training dataset 504.

In various aspects, the training component 502 can, prior to beginning training, initialize in any suitable fashion (e.g., random initialization) the trainable internal parameters (e.g., convolutional kernels, weight matrices, bias values) of the machine learning model 202.

In various aspects, the training component 502 can select from the training dataset 504 a training input 702 and a ground-truth annotation 708 corresponding to the training input 702. In various instances, as shown, the training input 702 can include a training medical image 704 and a set of training equipment parameters 706. In various cases, the training component 502 can execute the machine learning model 202 on the training input 702, thereby causing the machine learning model 202 to produce an output 710. More specifically, in some cases, an input layer of the machine learning model 202 can receive the training medical image 704, a conditioning layer of the machine learning model 202 can receive the set of training equipment parameters 706, both the training medical image 704 and the set of training equipment parameters 706 can complete a forward pass through one or more hidden layers of the machine learning model 202, and an output layer of the machine learning model 202 can compute the output 710 based on activations provided by the one or more hidden layers.

In various aspects, the output 710 can be considered as the predicted inferencing task result (e.g., predicted quality-enhanced image, predicted kernel-transformed image, predicted denoised image, predicted deconvolved image, predicted segmentation mask, predicted classification label) that the machine learning model 202 believes should correspond to the training input 702. In contrast, the ground-truth annotation 708 can be considered as the correct/accurate inferencing task result (e.g., correct/accurate quality-enhanced image, correct/accurate kernel-transformed image, correct/accurate denoised image, correct/accurate deconvolved image, correct/accurate segmentation mask, correct/accurate classification label) that is known or deemed to correspond to the training input 702. Note that, if the machine learning model 202 has so far undergone no or little training, then the output 710 can be highly inaccurate.

In various aspects, as shown, the training component 502 can compute an error or loss (e.g., MAE, MSE, cross-entropy) between the output 710 and the ground-truth annotation 708. In various instances, the training component 502 can incrementally update, via backpropagation, the trainable internal parameters of the machine learning model 202, based on such computed error or loss.

In various cases, the training component 502 can repeat such execution and update procedure for each training input in the training dataset 504. This can ultimately cause the trainable internal parameters of the machine learning model 202 to become iteratively optimized for accurately performing the inferencing task based on inputted medical images and inputted sets of equipment parameters. In various aspects, the training component 502 can implement any suitable training batch sizes, any suitable error/loss functions, or any suitable training termination criteria.

Figure 8:
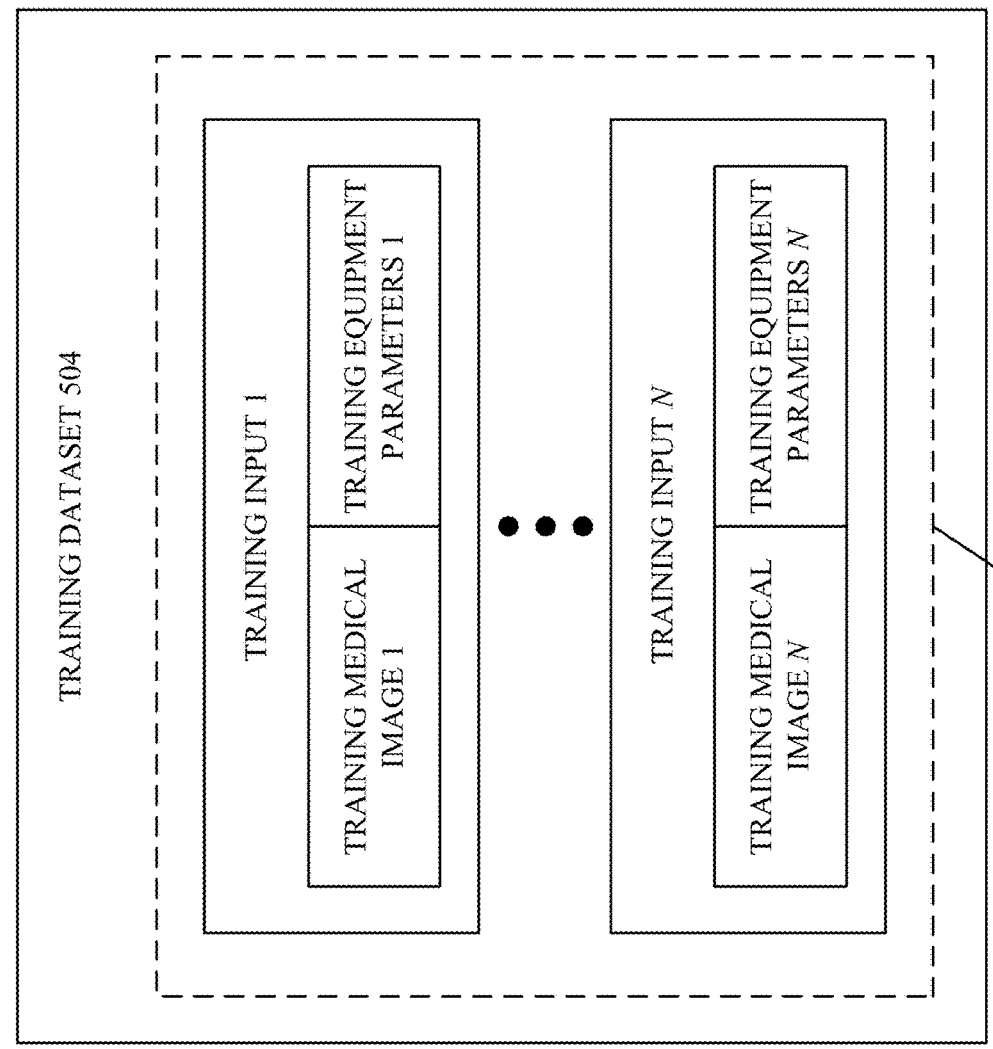

Now, consider FIG. 8. As shown, FIG. 8 illustrates a block diagram 800 showing an example, non-limiting embodiment of the training dataset 504. More specifically, as shown in the non-limiting example of FIG. 8, the training dataset 504 can be an unannotated training dataset. In such case, the training dataset 504 can comprise the set of training inputs 602, and the training dataset 504 can lack the set of ground-truth annotations 604. In other words, it can be the case that ground-truth annotations for the set of training inputs 602 are unknown or otherwise unavailable.

Figure 9:
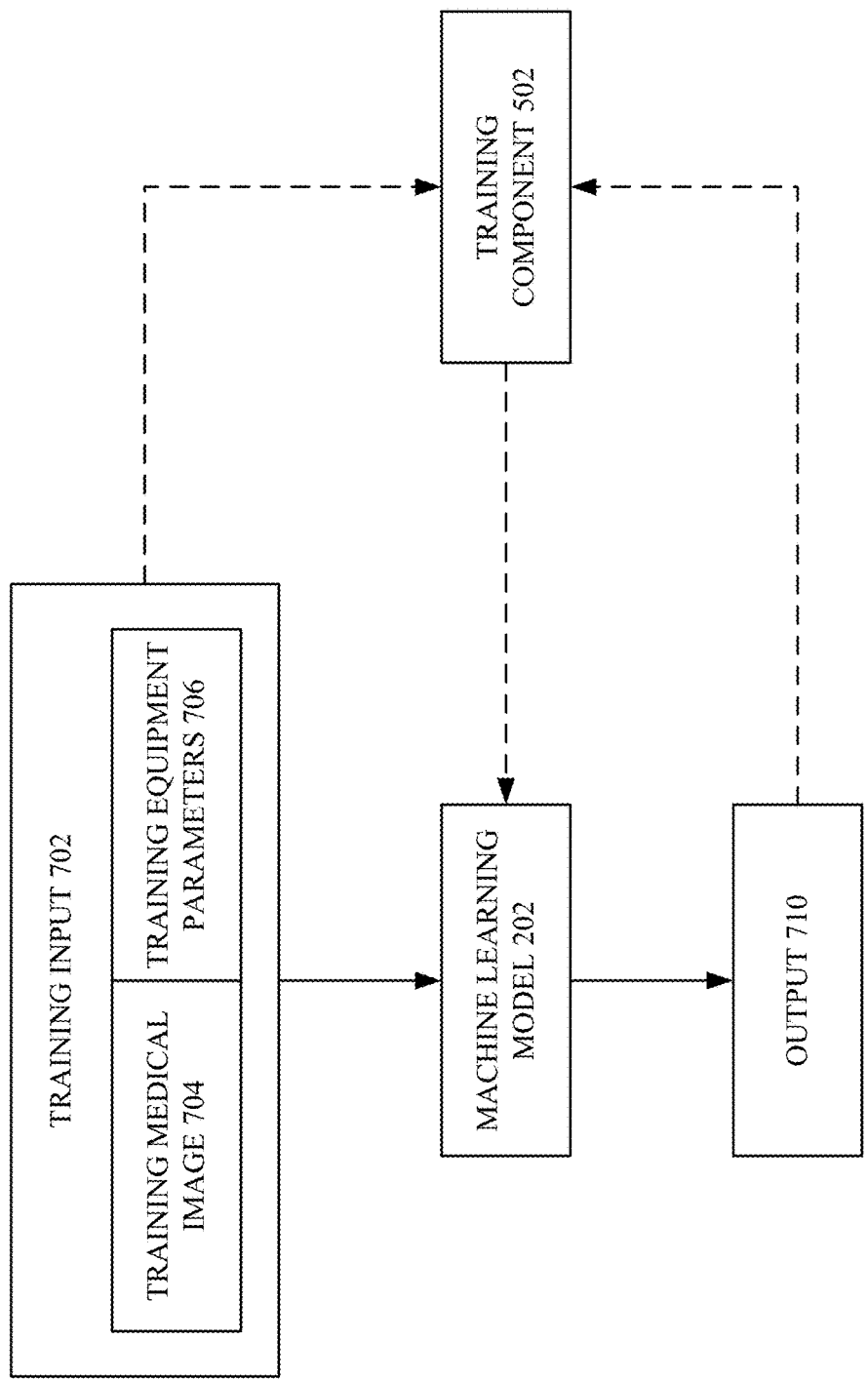

Now, consider FIG. 9. As shown, FIG. 9 illustrates a block diagram 900 showing how the machine learning model 202 can be trained in an unsupervised or semi-supervised fashion based on the training dataset 504.

As mentioned above, prior to beginning training, the training component 502 can initialize the trainable internal parameters (e.g., convolutional kernels, weight matrices, bias values) of the machine learning model 202 in any suitable fashion (e.g., random initialization).

As also mentioned above, the training component 502 can select the training input 702 from the training dataset 504 and can execute the machine learning model 202 on the training input 702, thereby causing the machine learning model 202 to produce the output 710.

In various aspects, because the training dataset 504 can, in this non-limiting example, be unannotated, there can be no ground-truth annotation with which to compute an error or loss for the output 710. However, the training component 502 can, in some instances, compute any suitable error or loss (e.g., MAE, MSE, cross-entropy), where such error or loss can be a function of the output 710 and of the training input 702. For example, suppose that the inferencing task is image deconvolution, and suppose that the set of training equipment parameters 706 includes a user-specified point-spread function with which the training medical image 704 was generated or captured. In such case, the training component 502 can convolve the output 710 with the user-specified point-spread function indicated by the set of training equipment parameters 706, and the training component 502 can compute an error or loss between the result of such convolution and the training medical image 704.

Thus, the training component 502 can, in some instances, compute an error or loss based on the output 710 and based on the training input 702 (e.g., in the absence of the ground-truth annotation 708). Accordingly, as mentioned above, the training component 502 can incrementally update, via backpropagation, the trainable internal parameters of the machine learning model 202, based on such computed error or loss.

Just as explained above, the training component 502 can repeat such execution and update procedure for each training input in the training dataset 504, which can ultimately cause the trainable internal parameters of the machine learning model 202 to become iteratively optimized for accurately performing the inferencing task based on inputted medical images and inputted sets of equipment parameters. Again, the training component 502 can implement any suitable training batch sizes, any suitable error/loss functions, or any suitable training termination criteria.

In various embodiments, when the machine learning model 202 has been trained as described herein, the machine learning model 202 can be considered as having learned how to adapt its analysis of any given medical image, based on the set of equipment parameters that accompany that given medical image. In other words, the machine learning model 202 can be considered as having learned how differences in equipment parameters can influence inferencing task outputs.

Figure 10:
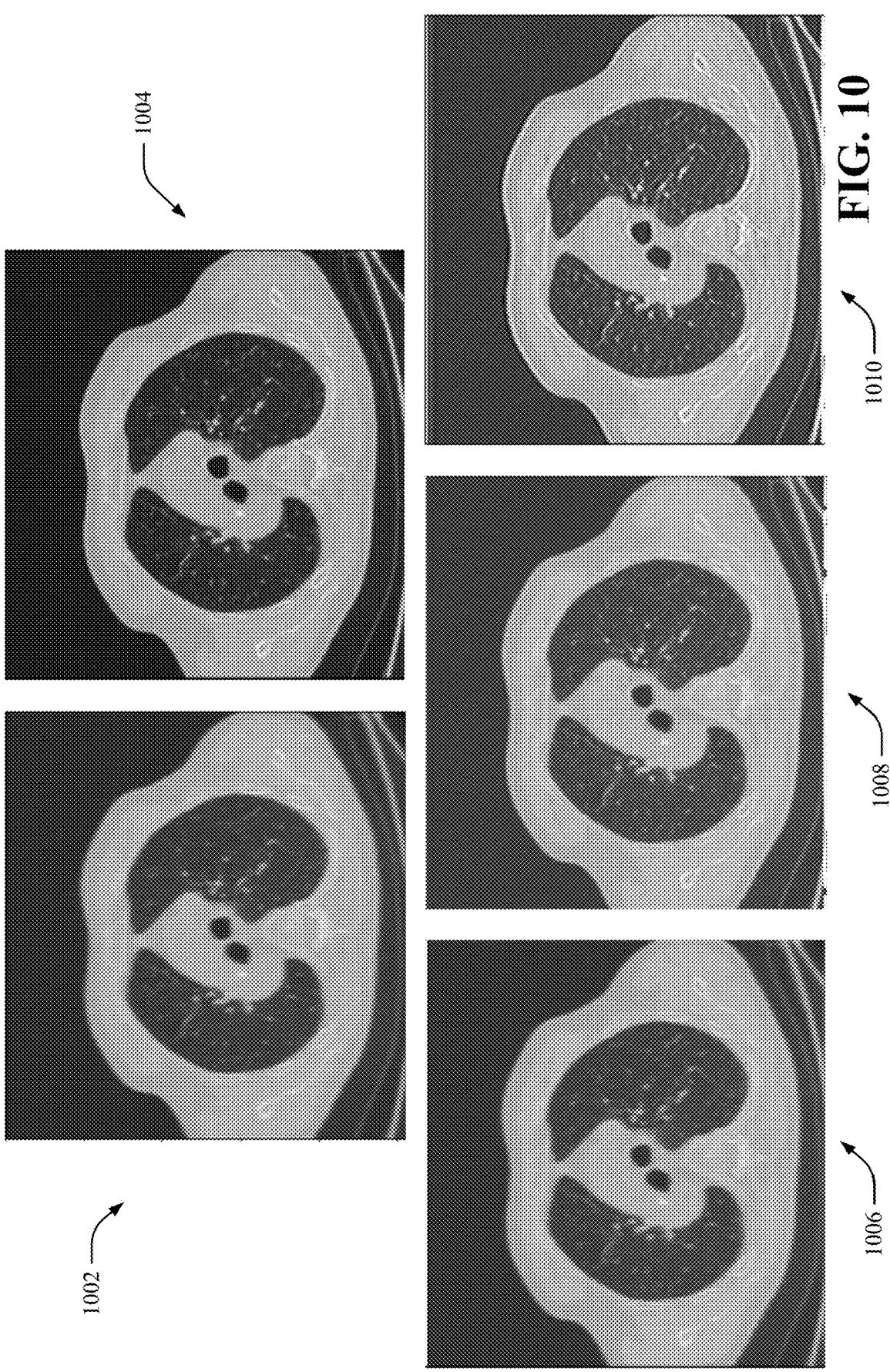

FIGS. 10-11 illustrate example, non-limiting experimental results in accordance with one or more embodiments described herein.

First, consider FIG. 10. As shown, FIG. 10 illustrates a CT scanned image 1002, a ground-truth deconvolved image 1004, a predicted deconvolved image 1006, a predicted deconvolved image 1008, and a predicted deconvolved image 1010.

In various aspects, the present inventors reduced to practice an example, non-limiting embodiment of the machine learning model 202 that was trained/configured to perform image deconvolution on CT scanned images. In various instances, the machine learning model 202 was configured/trained to receive as input not just a CT scanned image, but also a user-specified point-spread function that a CT scanner utilized to generate or capture such CT scanned image.

In various cases, the CT scanned image 1002 was obtained from a CT scanner, and the ground-truth deconvolved image 1004 was generated analytically. As a first execution run, the machine learning model 202 was fed the CT scanned image 1002 and a point-spread function that was finer than that with which the CT scanned image 1002 was actually generated/captured, and the machine learning model 202 produced as output the predicted deconvolved image 1006. As shown, the predicted deconvolved image 1006 is significantly blurrier than the ground-truth deconvolved image 1004. As a second execution run, the machine learning model 202 was fed the CT scanned image 1002 and a point-spread function that matched that with which the CT scanned image 1002 was actually generated/captured, and the machine learning model 202 produced as output the predicted deconvolved image 1008. As shown, the predicted deconvolved image 1008 matches the ground-truth deconvolved image 1004 very well. As a third execution run, the machine learning model 202 was fed the CT scanned image 1002 and a point-spread function that was coarser than that with which the CT scanned image 1002 was actually generated/captured, and the machine learning model 202 produced as output the predicted deconvolved image 1010. As shown, the predicted deconvolved image 1010 is significantly overdone as compared to the ground-truth deconvolved image 1004. Accordingly, these experimental results show that the machine learning model 202 can, when trained as described herein, adapt/change its internal analysis of an inputted medical image, where such adaptation/change can be based on the inputted, user-specified equipment parameters that accompany such inputted medical image.

Now, consider FIG. 11. As shown, FIG. 11 illustrates an ultrasound scanned image 1102, a predicted quality-enhanced image 1104, and a predicted quality-enhanced image 1106.

In various aspects, the present inventors reduced to practice an example, non-limiting embodiment of the machine learning model 202 that was trained/configured to perform image quality-enhancement on ultrasound scanned images. In various instances, the machine learning model 202 was configured/trained to receive as input not just an ultrasound scanned image, but also a user-specified acquisition frequency according to which an ultrasound scanner generated or captured such ultrasound scanned image.

In various cases, the ultrasound scanned image 1102 was obtained from an ultrasound scanner. As a first execution run, the machine learning model 202 was fed the ultrasound scanned image 1102 and an acquisition frequency that matched that with which the ultrasound scanned image 1102 was actually generated/captured, and the machine learning model 202 produced as output the predicted quality-enhanced image 1104. As a second execution run, the machine learning model 202 was fed the ultrasound scanned image 1102 and an acquisition frequency that did not match that with which the ultrasound scanned image 1102 was actually generated/captured, and the machine learning model 202 produced as output the predicted quality-enhanced image 1106. As shown, the predicted quality-enhanced image 1106 has various visual artefacts that are absent in the predicted quality-enhanced image 1104. Accordingly, these experimental results further show that the machine learning model 202 can, when trained as described herein, adapt/change its internal analysis of an inputted medical image, where such adaptation/change can be based on the inputted equipment parameters that accompany such inputted medical image.

Figure 12:
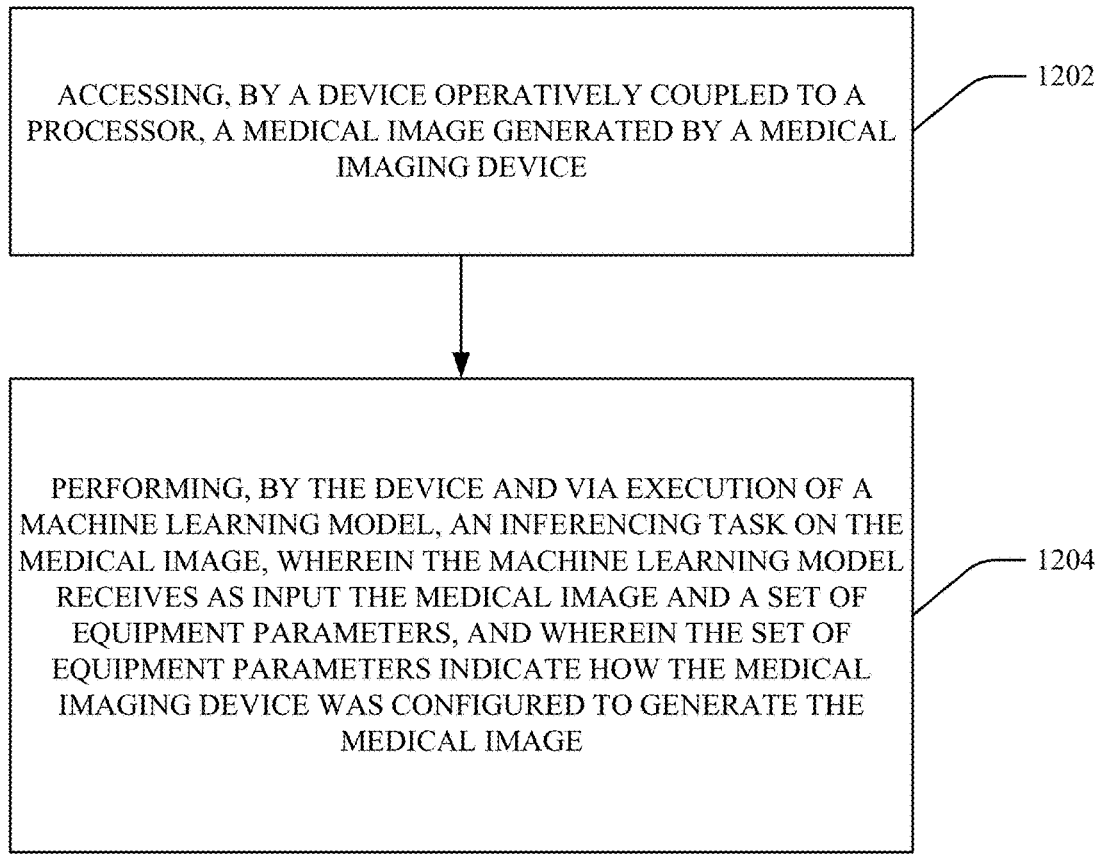
FIG. 12 illustrates a flow diagram of an example, non-limiting computer-implemented method that facilitates machine learning image analysis based on explicit equipment parameters in accordance with one or more embodiments described herein.

FIG. 12 illustrates a flow diagram of an example, non-limiting computer-implemented method 1200 that can facilitate machine learning image analysis based on explicit equipment parameters in accordance with one or more embodiments described herein. In various cases, the image analysis system 102 can facilitate the computer-implemented method 1200.

In various embodiments, act 1202 can include accessing, by a device (e.g., via 114) operatively coupled to a processor (e.g., 110), a medical image (e.g., 104) generated by a medical imaging device (e.g., 106).

In various aspects, act 1204 can include performing, by the device (e.g., via 116) and via execution of a machine learning model (e.g., 202), an inferencing task on the medical image. In various instances, the machine learning model can receive as input the medical image and a set of equipment parameters (e.g., 108), where the set of equipment parameters can indicate how the medical imaging device was configured to generate the medical image.

Although not explicitly shown in FIG. 12, the machine learning model can be a neural network, and the neural network can include a conditioning layer (e.g., 404) that can receive the set of equipment parameters. In various cases, the conditioning layer can be a feature-wise linear modulation layer.

Although not explicitly shown in FIG. 12, the set of equipment parameters can include a point-spread-function of the medical imaging device, an acquisition frequency of the medical imaging device, a focus depth of the medical imaging device, a time-gain compensation of the medical imaging device, a line density of the medical imaging device, a dose strength of the medical imaging device, or a step size of the medical imaging device.

Although not explicitly shown in FIG. 12, the computer-implemented method 1200 can further comprise: training, by the device (e.g., via 502), the machine learning model on a set of training inputs (e.g., 602). In various cases, a training input (e.g., training input n) can comprise a training medical image (e.g., training medical image n) paired with a set of training equipment parameters (e.g., set of training equipment parameters n).

Although not explicitly shown in FIG. 12, the machine learning model can produce as output an inferencing task result (e.g., 204) based on the medical image and based on the set of equipment parameters, and the computer-implemented method 1200 can further comprise: rendering, by the device (e.g., via 118), the inferencing task result on a graphical user-interface.

Various embodiments described herein can be considered as a computerized tool for facilitating machine learning image analysis based on explicit equipment parameters. A machine learning model implemented as described herein can be configured or trained to receive as explicit input features not just a medical image, but also a set of user-controllable equipment parameters according to which such medical image was generated or captured. Such a machine learning model can be considered as having learned how changes in such inputted equipment parameters can influence inferencing task outputs. Accordingly, when various teachings described herein are implemented, the machine learning model can be applied across various different sets of equipment parameters without globally-averaging its accuracy with respect to such different sets of equipment parameters, unlike various existing techniques. Therefore, various embodiments described herein certainly constitute a concrete and tangible technical improvement in the field of machine learning.

Although the herein disclosure mainly describes various embodiments as applying to medical images, this is a mere non-limiting example. In various aspects, the herein-described teachings can be extrapolated to any suitable types of imaging data (e.g., can be not limited only to imaging data in the medical/clinical context).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 13:
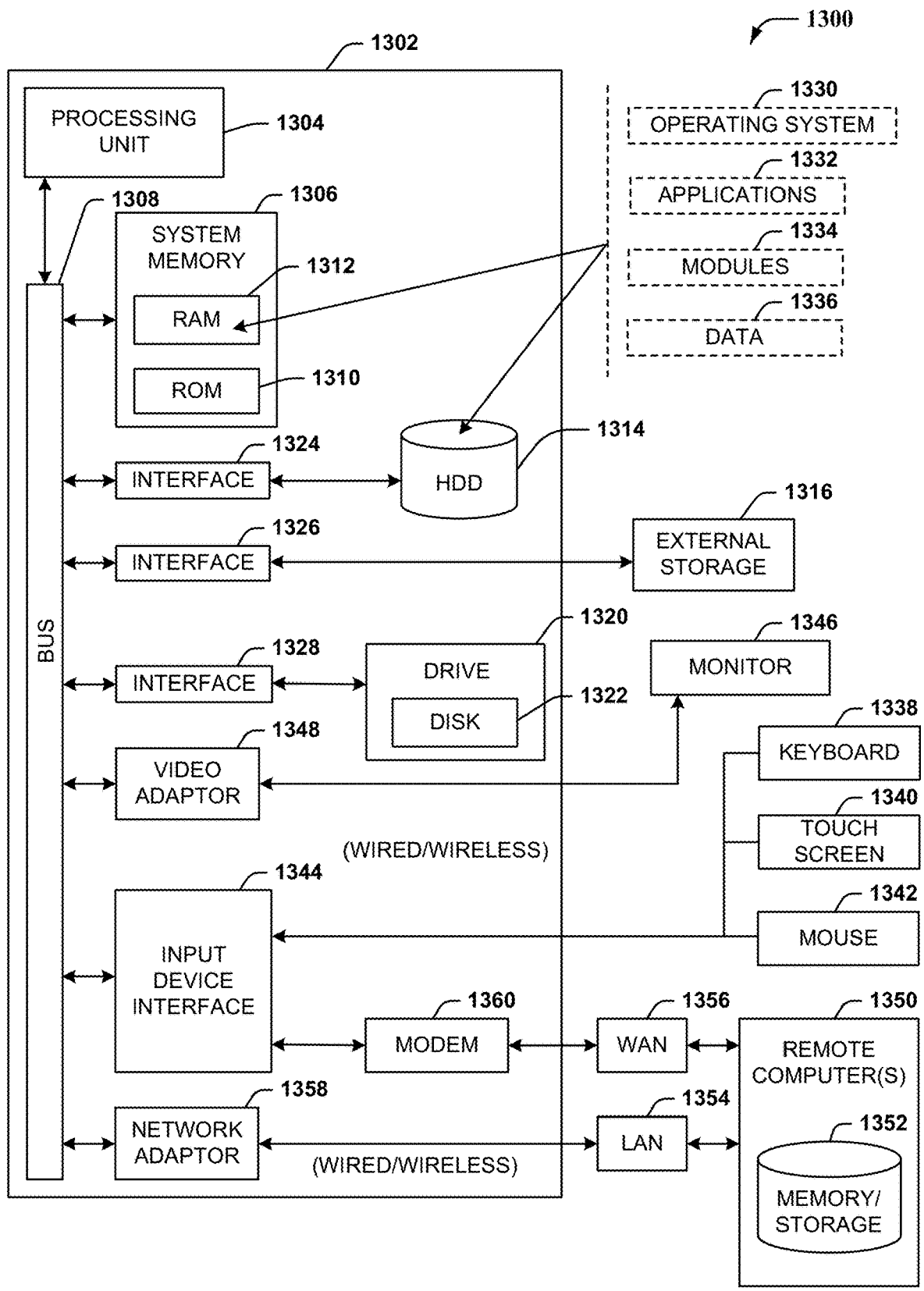
FIG. 13 illustrates a block diagram of an example, non-limiting operating environment in which one or more embodiments described herein can be facilitated.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and a drive 1320, e.g., such as a solid state drive, an optical disk drive, which can read or write from a disk 1322, such as a CD-ROM disc, a DVD, a BD, etc. Alternatively, where a solid state drive is involved, disk 1322 would not be included, unless separate. While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and drive 1320 can be connected to the system bus 1308 by an HDD interface 1324, an external storage interface 1326 and a drive interface 1328, respectively. The interface 1324 for external drive implementations can include at least one or both of Universal Serial Bus (USB) and Institute of Electrical and Electronics Engineers (IEEE)

1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, stand-alone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above, such as but not limited to a network virtual machine providing one or more aspects of storage or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
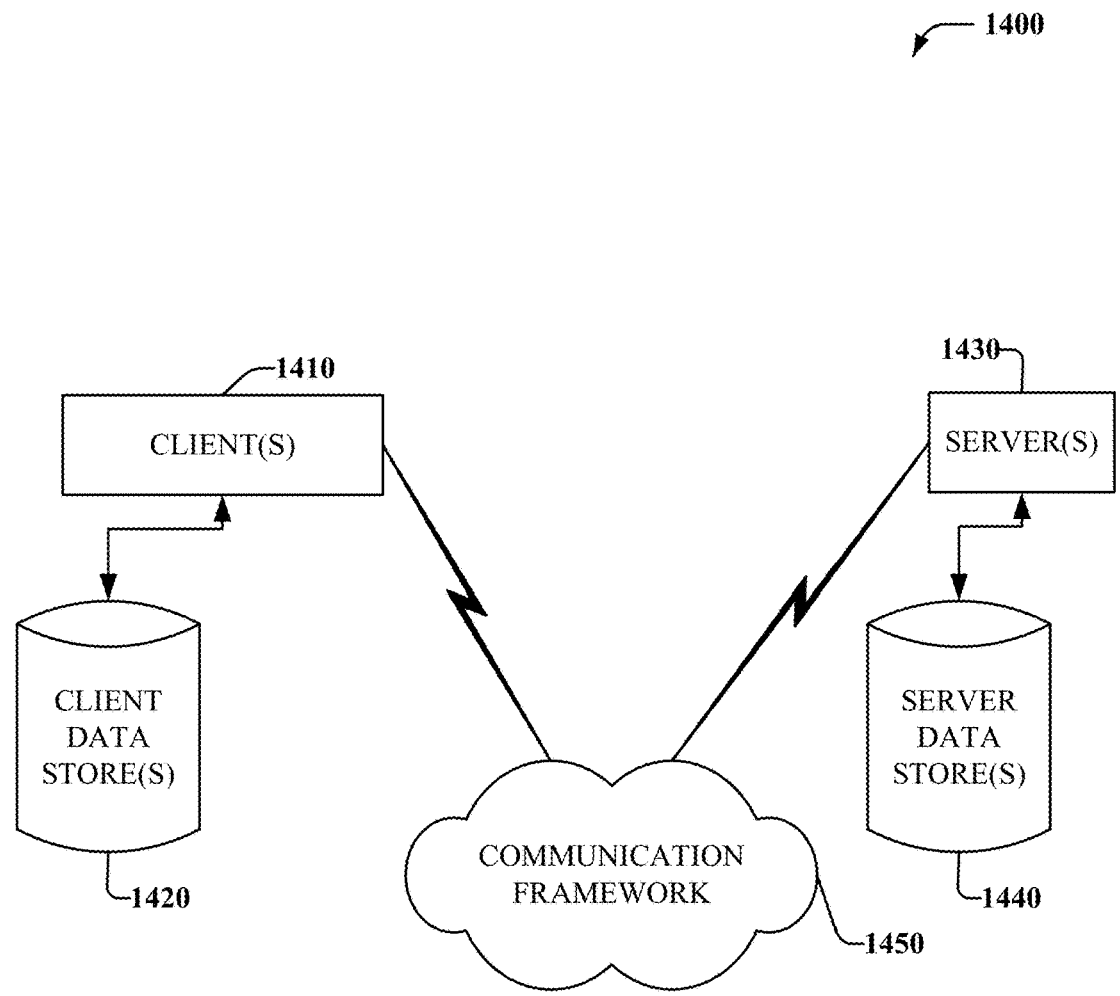
FIG. 14 illustrates an example networking environment operable to execute various implementations described herein.

FIG. 14 is a schematic block diagram of a sample computing environment 1400 with which the disclosed subject matter can interact. The sample computing environment 1400 includes one or more client(s) 1410. The client(s) 1410 can be hardware or software (e.g., threads, processes, computing devices). The sample computing environment 1400 also includes one or more server(s) 1430. The server(s) 1430 can also be hardware or software (e.g., threads, processes, computing devices). The servers 1430 can house threads to perform transformations by employing one or more embodiments as described herein, for example. One possible communication between a client 1410 and a server 1430 can be in the form of a data packet adapted to be transmitted between two or more computer processes. The sample computing environment 1400 includes a communication framework 1450 that can be employed to facilitate communications between the client(s) 1410 and the server(s) 1430. The client(s) 1410 are operably connected to one or more client data store(s) 1420 that can be employed to store information local to the client(s) 1410. Similarly, the server(s) 1430 are operably connected to one or more server data store(s) 1440 that can be employed to store information local to the servers 1430.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes computer-executable components stored in a non-transitory computer-readable memory, the computer-executable components comprising:
        an access component that accesses a medical image generated by a medical imaging device and a set of equipment parameters corresponding to the medical image, the set of equipment parameters comprising user-controllable operational settings of the medical imaging device; and an execution component that performs, via execution of a machine learning model, an inferencing task on the medical image, wherein the machine learning model receives as explicit input features, both the medical image and the set of equipment parameters, and an inferencing task output generated by the machine learning model which is conditioned on the values of the set of equipment parameters.

2. The system of claim 1, wherein the machine learning model is a neural network comprising a conditioning layer that receives the set of equipment parameters and influences hidden layer activations based on the set of equipment parameters.

3. The system of claim 2, wherein the conditioning layer is a feature-wise linear modulation layer.

4. The system of claim 1, wherein the set of equipment parameters include a point-spread-function of the medical imaging device, an acquisition frequency of the medical imaging device, a focus depth of the medical imaging device, a time-gain compensation of the medical imaging device, a line density of the medical imaging device, a dose strength of the medical imaging device, or a step size of the medical imaging device.

5. The system of claim 1, wherein the computer-executable components further comprise:
    a training component that trains the machine learning model on a set of training inputs, and wherein a training input comprises a training medical image paired with a set of training equipment parameters.

6. The system of claim 1, wherein the machine learning model produces as output an inferencing task result based on the medical image and based on the set of equipment parameters, and wherein the computer-executable components further comprise:
    a result component that renders the inferencing task result on a graphical user-interface.

7. The system of claim 1, wherein the inferencing task is image quality enhancement, image deconvolution, image segmentation, or image classification.

8. A computer-implemented method, comprising: accessing, by a device operatively coupled to a processor, medical image generated by a medical imaging device and a set of equipment parameters corresponding to the medical image, the set of equipment parameters comprising user-controllable operational settings of the medical imaging device; and
    performing, by the device and via execution of a machine learning model, an inferencing task on the medical image, wherein the machine learning model receives, as explicit input features, both the medical image and the set of equipment parameters, and an inferencing task output generated by the machine learning model which is conditioned on the values of the set of equipment parameters.

9. The computer-implemented method of claim 8, wherein the machine learning model is a neural network, and wherein the neural network includes a conditioning layer, the conditioning layer receiving the set of equipment parameters and influencing hidden layer activations based on the set of equipment parameters.

10. The computer-implemented method of claim 9, wherein the conditioning layer is a feature-wise linear modulation layer.

11. The computer-implemented method of claim 8, wherein the set of equipment parameters include a point-spread-function of the medical imaging device, an acquisition frequency of the medical imaging device, a focus depth of the medical imaging device, a time-gain compensation of the medical imaging device, a line density of the medical imaging device, a dose strength of the medical imaging device, or a step size of the medical imaging device.

12. The computer-implemented method of claim 8, further comprising:
    training, by the device, the machine learning model on a set of training inputs, and wherein a training input comprises a training medical image paired with a set of training equipment parameters.

13. The computer-implemented method of claim 8, wherein the machine learning model produces as output an inferencing task result based on the medical image and based on the set of equipment parameters, and further comprising:

rendering, by the device, the inferencing task result on a graphical user-interface.

14. The computer-implemented method of claim 8, wherein the inferencing task is image quality enhancement, image deconvolution, image segmentation, or image classification.

15. A computer program product for facilitating machine learning image analysis based on explicit equipment parameters, the computer program product comprising a non-transitory computer-readable memory having program instructions embodied therewith, the program instruction executable by a processor to cause the processor to:

access an image captured by an imaging device and a set of equipment parameters corresponding to the image, the set of equipment parameters comprising user-controllable operational settings of the imaging device;

generate, via execution of a machine learning model, an inferencing task output corresponding to the image, wherein the machine learning model receives, as explicit input features, both the image and the set of equipment parameters, and an inferencing task output generated by the machine learning model which is conditioned on the values of the set of equipment parameters; and render the inferencing task output on an electronic display.

16. The computer program product of claim 15, wherein the machine learning model is a neural network, and wherein the neural network includes a conditioning layer, the conditioning layer receiving the set of equipment parameters and influencing hidden layer activations based on the set of equipment parameters.

17. The computer program product of claim 16, wherein the conditioning layer is a feature-wise linear modulation layer.

18. The computer program product of claim 15, wherein the set of equipment parameters include a point-spread-function of the imaging device, an acquisition frequency of the imaging device, a focus depth of the imaging device, a time-gain compensation of the imaging device, a line density of the imaging device, a dose strength of the imaging device, or a step size of the imaging device.

19. The computer program product of claim 15, wherein the program instructions are further executable to cause the processor to:

train the machine learning model on a set of training inputs, and wherein a training input comprises a training image paired with a set of training equipment parameters.

20. The computer program product of claim 15, wherein the inferencing task output is a quality-enhanced version of the image, a deconvolved version of the image, a segmentation mask of the image, or a classification label of the image.

* * * * *